United States Patent
Yamashita et al.

(10) Patent No.: US 11,491,917 B2
(45) Date of Patent: Nov. 8, 2022

(54) TILTING MECHANISM OF VIEW DEVICE FOR VEHICLE

(71) Applicant: MURAKAMI CORPORATION, Shizuoka (JP)

(72) Inventors: Toshiharu Yamashita, Shimada (JP); Yoshiaki Nagashima, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 17/460,730

(22) Filed: Aug. 30, 2021

(65) Prior Publication Data
US 2022/0073000 A1 Mar. 10, 2022

(30) Foreign Application Priority Data

Sep. 8, 2020 (JP) .............................. JP2020-150631

(51) Int. Cl.
  *B60R 1/02* (2006.01)
  *B60R 1/06* (2006.01)
  *F16M 13/02* (2006.01)

(52) U.S. Cl.
  CPC .............. *B60R 1/06* (2013.01); *F16M 13/022* (2013.01)

(58) Field of Classification Search
  CPC .......... B60R 1/06; B60R 1/076; F16M 13/022
  USPC ..... 248/479, 475.1, 476, 477, 478; 359/871, 359/872, 874, 875, 877
  See application file for complete search history.

(56) References Cited

U.S. PATENT DOCUMENTS

| | | | |
|---|---|---|---|
| 5,120,015 A * | 6/1992 | do Espirito Santo ........................ | B60R 1/0617 248/479 |
| 9,926,970 B2 * | 3/2018 | Lang ...................... | F16M 13/02 |
| 2007/0211356 A1 * | 9/2007 | Brester ................... | B60R 1/076 359/872 |
| 2008/0310041 A1 * | 12/2008 | Sinelli ..................... | B60R 1/074 359/879 |
| 2011/0083300 A1 * | 4/2011 | Heger ...................... | B60R 1/06 16/321 |
| 2016/0102702 A1 * | 4/2016 | Lang ....................... | B60R 1/076 248/479 |
| 2019/0315277 A1 * | 10/2019 | Sawada ..................... | B60R 1/10 |

FOREIGN PATENT DOCUMENTS

JP 07-315128 12/1995

* cited by examiner

*Primary Examiner* — Todd M Epps
(74) *Attorney, Agent, or Firm* — Greenblum & Bernstein, P.L.C.

(57) ABSTRACT

A tilting mechanism of a view device for a vehicle has a configuration in which a rotating section is rotatably supported on a shaft of a fixed portion. A helical compression spring is fitted onto the shaft. A plate is attached to the free-end side of the shaft via a washer. An outer circumferential surface of the shaft and a center hole of the washer include respective different diameter portions. A gap g in a radial direction is formed between the outer circumferential surface of the shaft and an inner circumferential surface of the center hole of the washer. The tilting mechanism includes a deviation mechanism. The deviation mechanism makes the gap g become narrow or zero at the different diameter portions at at least one place, the different diameter portions facing each other, by making the washer move relative to the shaft in the radial direction.

8 Claims, 20 Drawing Sheets

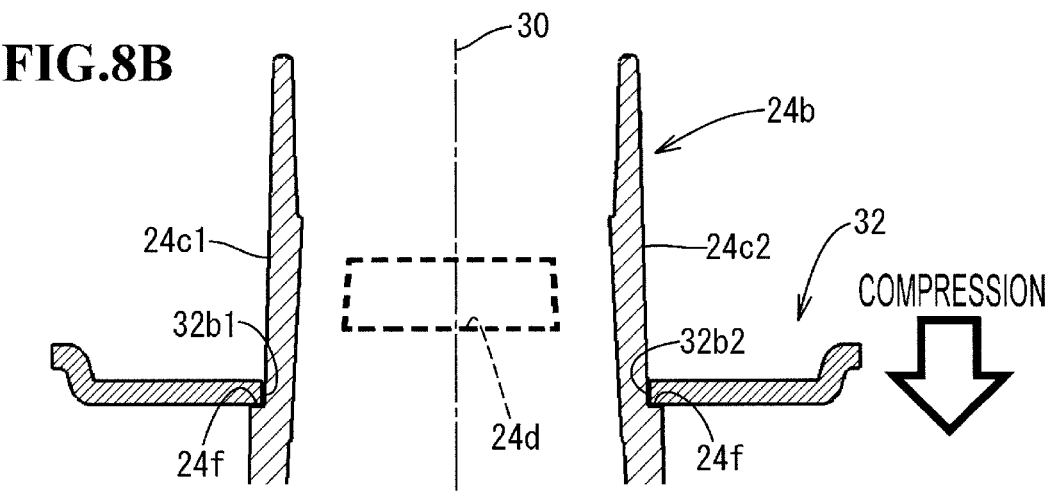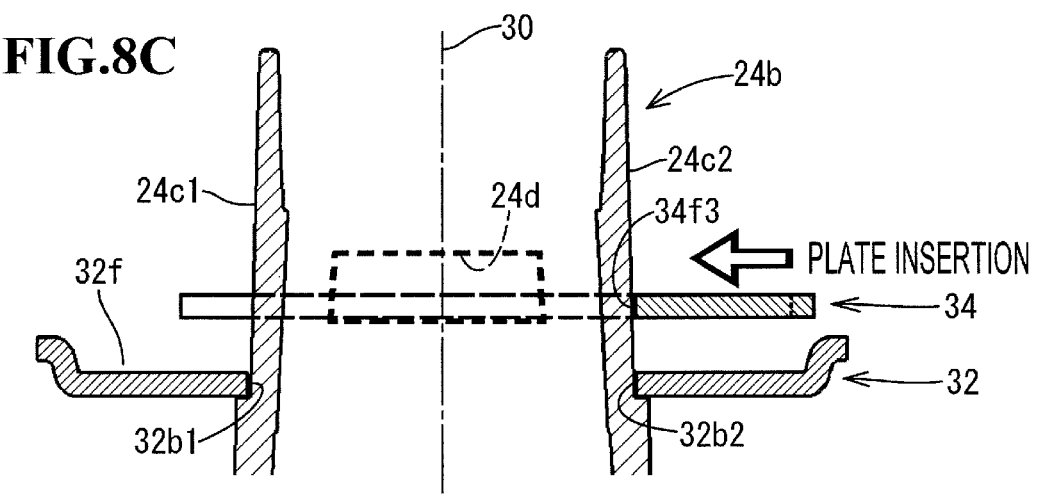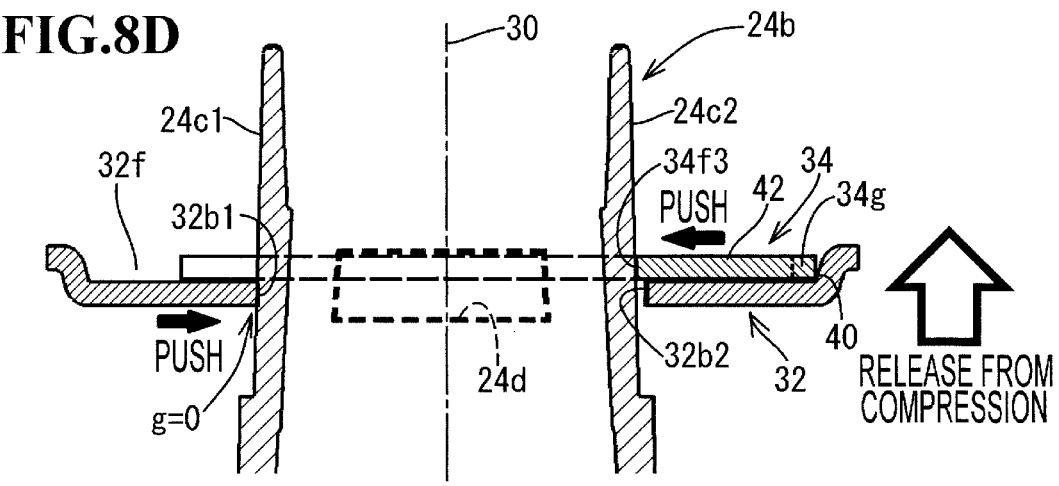

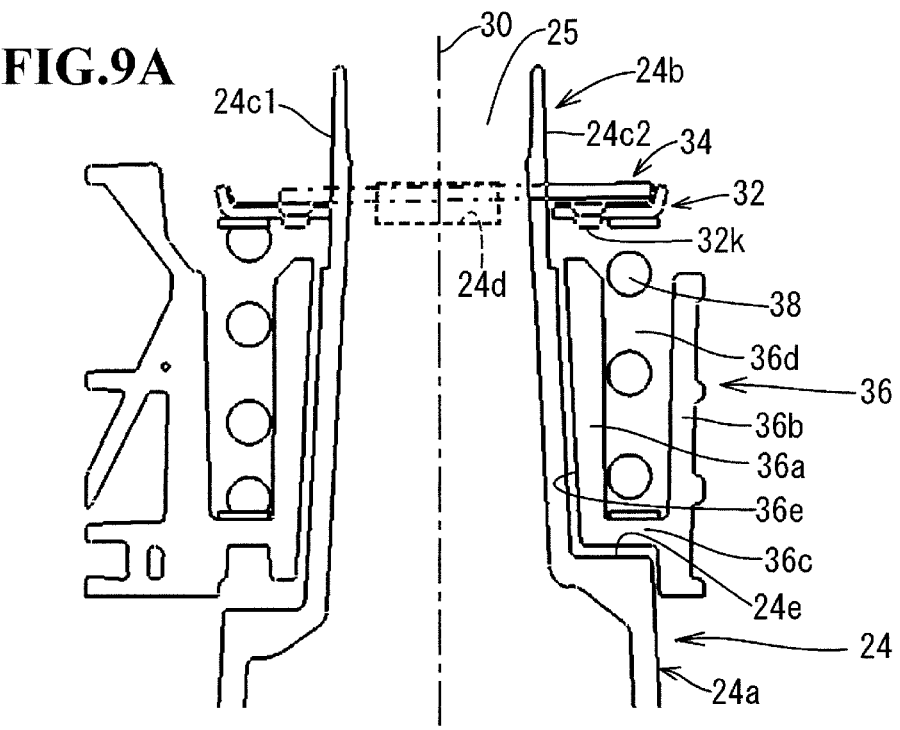
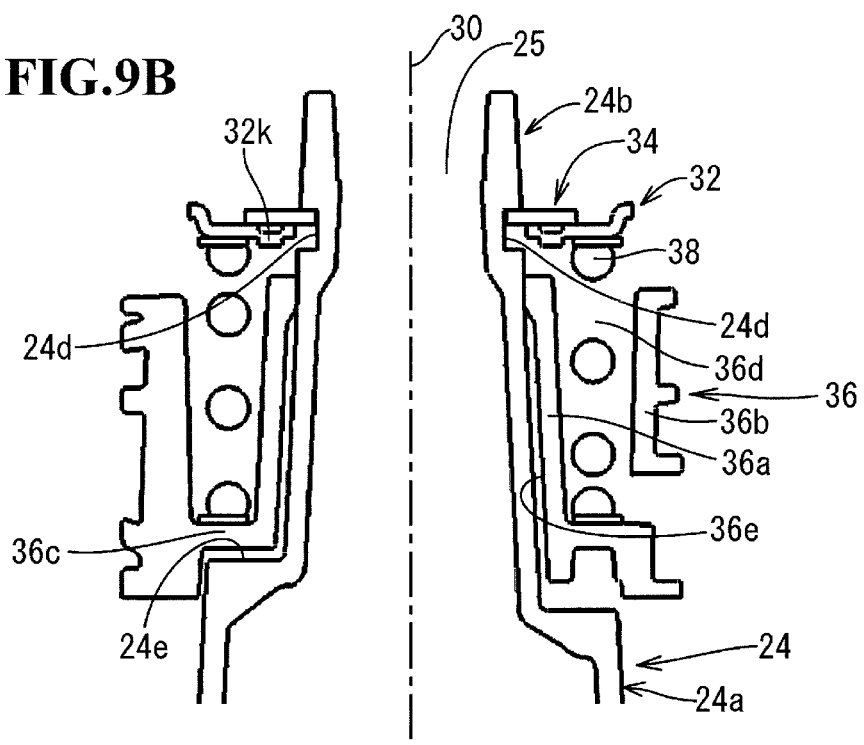

TILTING MECHANISM OF VIEW DEVICE FOR VEHICLE

The disclosure of Japanese Patent Application No. 2020-150631 filed on Sep. 8, 2020 including the specification, drawings, claims and abstract is incorporated herein by reference in its entirety.

BACKGROUND OF THE INVENTION

1. Field of the Invention

This invention relates to a tilting mechanism in a view device for a vehicle such as a door mirror, the tilting mechanism including a rotating section with a view section body such as a mirror plate or a camera mounted therein, the rotating section being rotatably supported by a fixed portion on the vehicle body side to enable the rotating section to move at least to a use position, with reduced abnormal noise when the rotating section is rotated.

2. Description of the Related Art

A door mirror of a vehicle is generally configured in such a manner that a rotating section with a mirror plate mounted therein is movable to a retracted position and a use position (extended position) by being rotatably supported on a shaft provided in a standing manner in a fixed portion of an outer surface of a door.

FIG. 2 illustrates an example of a mechanism of the periphery of a shaft of a tilting mechanism in a conventional manually retractable door mirror in an exploded manner, the tilting mechanism including a rotating section rotatably supported by a fixed portion. This mechanism will briefly be described. A shaft 24 is fixedly provided in a standing manner on a non-illustrated base fixedly installed on an outer surface of a door, via screw-fastening. The shaft 24 and the base form the fixed portion of the door mirror. Note that the base and the shaft may be formed as a single-piece structure via, e.g., monoblock casting or integral molding. A frame of the non-illustrated rotating section is rotatably supported on the shaft 24. An axis 30 (center axis) of the shaft 24 forms a rotation axis of the rotating section. With the frame of the rotating section supported on the shaft 24, a non-illustrated helical compression spring is fitted onto the shaft 24 in an expandable/compressible manner. Furthermore, a washer 32 is fitted onto the shaft 24 in such a manner as to be capable of moving up and down, on the upper side of the helical compression spring. A lower end surface of the helical compression spring is placed and supported on a bottom plate of the frame of the rotating section. The washer 32 is placed and supported on an upper end surface of the helical compression spring. With the helical compression spring compressed by depressing the washer 32 against a spring force of the helical compression spring, a plate 34 having a U-shape (U-plate) is attached to the shaft 24 on the upper side of the washer 32 from a lateral side of the shaft 24 by the plate 34 being inserted into two grooves 24d in opposite side surfaces of the shaft 24. Consequently, upward movement of the washer 32 relative to the shaft 24 is prevented by the plate 34. In this state, upon release of the helical compression spring from the depression (compression), the biasing force of the helical compression spring is imposed between the bottom plate of the frame of the rotating section and the washer 32, and the imposition of the biasing force is held. The biasing force acts as a force of pushing the rotating section against the fixed portion. In respective surfaces of the rotating section and the fixed portion, the surfaces abutting on each other, projecting/recessed fitting structures are formed at regular intervals at a plurality of places along a direction around the rotation axis 30. In FIG. 2, an upper surface 24e of a shaft base portion, which is the abutting surface of the fixed portion, is shown. The fitting structures are fitted together at least when the rotating section is in a use position. The fitting enables the rotating section to be held in the use position. Also, the rotating section can be moved to a retracted position by undoing the fitting through application of a force of a value that is equal to or exceeds a predetermined value in a direction around the rotation axis to the rotating section in the use position. Alternatively, the rotating section can be moved to a forward-tilted position by application of a force of a value that is equal to or exceeds a predetermined value to the rotating section in the use position in a reverse direction around the rotation axis.

A width-across-flats part 24c is formed in an outer circumferential surface of the shaft 24. A width-across-flats part 32b is also formed in an inner circumferential surface of a center hole 32a of the washer 32. The width-across-flats parts 24c, 32b engage with each other. The width-across-flats parts 24c, 32b form a rotation preventing mechanism that prevents the washer 32 from rotating free around the axis 30. Upon the rotating section being manually rotated around the axis 30 in a state in which the manually retractable door mirror including the tilting mechanism in FIG. 2 is assembled, the following operation occurs. Since the lower end surface of the helical compression spring is placed and supported on the bottom plate of the frame of the rotating section and the helical compression spring is in abutment with a place of the placement and support in a pushed state, the helical compression spring rotates integrally with the frame. On the other hand, since the width-across-flats parts 24c, 32b of the shaft 24 and the washer 32 engage with each other, rotation of the washer 32 relative to the shaft 24 is prevented. Therefore, at this time, the helical compression spring and the washer 32 rotate relative to each other around the axis 30 while slippage occurring between the upper end surface of the helical compression spring and a lower surface of the washer 32.

As a related art literature, there is, for example, Japanese Patent Laid-Open No. H07-315128 (1995-315128) that discloses a tilting mechanism of a door mirror, the tilting mechanism having a configuration in which a helical compression spring is held on a shaft using a washer and a U-plate.

A manually retractable door mirror including the tilting mechanism in FIG. 2 has the problem that when the rotating section is manually moved from a retracted position to a use position or from the use position to the retracted position, abnormal noise (e.g., rattling sound) occurs.

This invention solves the aforementioned problem in the conventional techniques and provides a tilting mechanism of a view device for a vehicle, with reduced abnormal noise when a rotating section is rotated (including no occurrence of abnormal noise).

SUMMARY OF THE INVENTION

The inventors investigated a cause of occurrence of the aforementioned rattling sound in a manually retractable door mirror including the tilting mechanism in FIG. 2 through tests and found that the rattling sound occurs due to collision between the outer circumferential surface of the shaft 24 and the inner circumferential surface of the washer 32. A way of occurrence of rattling sound will be described with reference to FIGS. 3A and 3B. FIGS. 3A and 3B each illustrate a section (that is, a section in a direction orthogonal to the axis 30) of the shaft 24 at a position at which the washer 32 is present (that is, a position of the shaft 24 in a direction along the axis 30) in a state in which a manually retractable door mirror including the tilting mechanism in FIG. 2 is assembled and each indicate a positional relationship between the washer 32 and the shaft 24 at the position. FIG. 3A illustrates a state before the rotating section is rotated and FIG. 3B illustrates a state when the rotating section is rotated. In FIG. 3A, the shaft 24 is inserted in the center hole 32a of the washer 32. The width-across-flats parts 24c, 32b of the shaft 24 and the washer 32 face each other. In this state, a gap g occurs between the outer circumferential surface of the shaft 24 and the inner circumferential surface of the washer 32. The gap g inevitably occurs where the shaft 24 has a tapered shape because of, e.g., a draft. In other words, in assembling of the door mirror including the tilting mechanism in FIG. 2, when the helical compression spring and the washer 32 are fitted onto the shaft 24 and the plate 34 is inserted to the grooves 24d, it is necessary to temporarily push the washer 32 downward. At this time, if the shaft 24 is thicker on the lower side because of the tapered shape, in order to push down the washer 32, it is necessary that the center hole 32a of the washer 32 have a size according to the thickness of the shaft at a position to which washer 32 is pushed down. As a result, the gap g occurs between the outer circumferential surface of the shaft 24 and the inner circumferential surface of the washer 32 in a state in which the washer 32 has returned to a height at which the washer 32 is locked on the plate 34 by the biasing force of the helical compression spring as a result of the helical compression spring being released from the compressed state after insertion of the plate 34 to the grooves 24d. The gap g also occurs depending on a manufacturing error (tolerance) between the shaft 24 and the washer 32. Then, where there is the gap g, when the rotating section is manually moved from the retracted position to the use position or from the use position to the retracted position, as illustrated in FIG. 3B, at the beginning of the movement, the washer 32 rotates around the axis 30 together with the helical compression spring. The rotation of the washer 32 is stopped as a result of the washer 32 becoming unable to rotate any further because of intermediate portions in a circumferential direction of the width-across-flats part 32b of the inner circumferential surface of the washer 32 colliding with respective boundary positions P between the width-across-flats part 24c and a circular portions 24g of the outer circumferential surface of the shaft 24. The collision causes rattling sound. In particular, if the gap g is larger, the rattling sound is larger. Also, when the washer 32 rotates, rubbing sound may occur between the washer 32 and the plate 34. This invention solves the aforementioned problems in the conventional techniques and provides a tilting mechanism of a view device for a vehicle, with reduced abnormal noise when a rotating section is rotated.

In a tilting mechanism of a view device for a vehicle of this invention, the tilting mechanism includes: a fixed portion to be fixed to a vehicle body, the fixed portion including a shaft; a rotating section capable of mounting a view section body therein, the rotating section being supported by the fixed portion in such a manner as to be rotatable around a center axis of the shaft; a helical compression spring that is fitted onto the shaft of the fixed portion by which the rotating section is supported and that provides a pushing force between the rotating section and the fixed portion; a washer including a center hole, the washer being fitted onto the shaft in such a manner that the shaft is inserted in the center hole on a free-end side of the shaft with the helical compression spring fitted thereon; a plate attached to the free-end side of the shaft with the helical compression spring and the washer fitted thereon, the plate preventing the washer from being moved to the free-end side of the shaft by a biasing force of the helical compression spring and a deviation mechanism, wherein a gap in a radial direction of the shaft and the washer is formed between an outer circumferential surface of the shaft and an inner circumferential surface of the center hole of the washer; the outer circumferential surface of the shaft includes a different diameter portion that is different in diameter from another part in a direction around the center axis of the shaft, the different diameter portion being formed at one or more places in the direction around the center axis of the shaft; the inner circumferential surface of the center hole of the washer includes a different diameter portion that is different in diameter from another part in a direction around a center axis of the center hole, the different diameter portion being formed at one or more places in the direction around the center axis of the center hole; and the deviation mechanism acts between the shaft and the washer to move the washer relative to the shaft in the radial direction to deviate a position of the center hole of the washer relative to a position of the shaft in such a manner that the gap becomes narrow or zero between the respective different diameter portions at at least one place, the different diameter portions facing each other, whereby when a rotational force for rotation around the center axis of the shaft is applied to the washer, the deviation mechanism curbs rotation of the washer via engagement between the different diameter portions. Each of the different diameter portions can be formed by, for example, a non-circular portion such as a width-across-flats part or a D-shaped portion or in any of various other shapes. According to this invention, the deviation mechanism moves the washer relative to the shaft in the radial direction to deviate the position of the center hole of the washer relative to the position of the shaft in such a manner that the gap becomes narrow or zero between the respective different diameter portions at at least one place, the different diameter portions facing each other. Therefore, when a rotational force for rotation around the shaft is imposed on the washer, rotation of the washer can be prevented by engagement between the different diameter portions at the place at which the gap becomes narrow or zero. Consequently, abnormal noise when the rotating section is rotated can be reduced.

In this invention, it is possible that: the deviation mechanism includes a clamped portion formed in the plate and a clamping portion formed in the washer, the clamped portion and the clamping portion being disposed at respective positions on an opposite side of the shaft from the different diameter portions at the place at which the gap between the different diameter portions becomes narrow or zero; and the clamped portion is clamped between the shaft and the clamping portion and deviates the position of the center hole of the washer from the position of the shaft by restricting a distance between the shaft and the clamping portion due to the gap being reduced to be smaller than a predetermined state. Here, where the different diameter portions are formed by width-across-flats parts, the deviation mechanism can deviate the position of the center hole of the washer, for example, to one side in a direction in which surfaces of the width-across-flats parts face each other.

In this invention, it is possible that: the washer includes a wall that rises upward from an entire outer circumference of the washer and a space on an inner circumferential side of the wall forms a plate receiving space that receives the plate; the deviation mechanism includes respective abutment parts via which an outer circumferential surface of the plate received in the plate receiving space and an inner wall surface of the wall abut on each other; the abutment part of the wall forms the clamping portion; and a part of the plate, the part being located between the abutment part of the plate and the shaft, forms the clamped portion.

In this invention, it is possible that: the clamped portion includes a plate-side lug formed at the outer circumferential surface of the plate in such a manner as to project outward in a radial direction of the plate; and the plate abuts on the abutment part of the wall at the plate-side lug.

In this invention, it is possible that: the clamping portion includes a washer-side lug formed at the inner wall surface of the wall of the washer in such a manner as to project inwardly in the radial direction of the washer; and the washer abuts on the outer circumferential surface of the plate at the washer-side lug.

In this invention, it is possible that: the deviation mechanism includes projection/recess fitting structures formed in respective surfaces of the washer and the plate, the surfaces facing each other in a direction along the center axis of the shaft; and the fitting structure on the washer side forms the clamping portion, a part of the plate, the part being located between the fitting structure on the plate side and the shaft, forms the clamped portion.

In this invention, it is possible that: the clamped portion includes an insert formed in such a manner as to project downward from a position in an inner circumference of the plate; the insert is inserted to the gap at a position on the opposite side of the shaft from the different diameter portions at the place at which the gap becomes narrow or zero; and the inner circumferential surface of the center hole of the washer forms the clamping portion at the position at which the insert is inserted to the gap. Here, where the different diameter portions are formed by width-across-flats parts, for example, it is possible that: the clamped portion includes an insert formed in such a manner as to project downward from a position in the inner circumference of the plate; one surface of the width-across-flats part of the washer forms the clamping portion; and the insert is inserted to the gap between one surface of the width-across-flats part, the one surface forming the clamping portion of the washer, and one surface of the width-across-flats part of the shaft, the one surface of the width-across-flats part of the shaft facing the one surface of the width-across-flats part of the washer.

In this invention, it is possible that: the tilting mechanism includes an additional plate clamped between opposed surfaces of the washer and the plate, the opposed surfaces facing each other in the direction along the center axis of the shaft; the deviation mechanism includes a clamped portion formed in the additional plate and a clamping portion formed in the washer; the clamped portion is clamped between the shaft and the clamping portion and deviates the position of the center hole of the washer relative to the position of the shaft by restricting a distance between the shaft and the clamping portion due to the gap being reduced to be smaller than a predetermined state. Here, where the different diameter portions are formed by the width-across-flats parts, for example, the "deviate" corresponds to deviating the position of the center hole of the washer to the one side in the direction in which the surfaces of the width-across-flats parts face each other.

In this invention, it is possible that: the deviation mechanism includes an inclined surface formed at least one of respective surfaces of the clamping portion and the clamped portion, the surfaces abutting on each other; the inclined surface is a surface inclined relative to the center axis of the shaft (that is, a surface inclined relative to the direction along the center axis); and the inclined surface makes the abutting surfaces of the clamping portion and the clamped portion slide along the inclined surface by converting a part of the biasing force of the helical compression spring, the biasing force being applied to the washer, into a force that moves the washer relative to the shaft in the radial direction, whereby the position of the center hole of the washer is deviated relative to the position of the shaft. Here, where the different diameter portions are formed by the width-across-flats parts, for example, the "radial direction" corresponds to a direction toward the one side in the direction in which the surfaces of the width-across-flats parts face each other. Also, where the different diameter portions are formed by the width-across-flats parts, for example, the "deviate" corresponds to deviating the position of the center hole of the washer to the one side in the direction in which the surfaces of the width-across-flats parts face each other.

In this invention, the tilting mechanism can be configured, for example, as follows. The inclined surface is set in such a manner that at an intermediate position in a course of the abutment surfaces of the clamping portion and the clamped portions sliding relative to each other along the inclined surface via the biasing force of the helical compression spring, the outer circumferential surface of the shaft and the inner circumferential surface of the center hole of the washer abut on each other via the respective different diameter portions at the place at which the gap becomes narrow or zero, and movement of the washer in the radial direction relative to the shaft is thereby prevented. The tilting mechanism is thereby configured in such a manner that the outer circumferential surface of the shaft and the inner circumferential surface of the center hole of the washer are kept being pushed against and abutting on each other via the respective different diameter portions at the place at which the gap becomes narrow or zero by the biasing force of the helical compression spring.

Here, where the different diameter portions are formed by the width-across-flats parts, the tilting mechanism can be configured, for example, as follows. The inclined surface is set in such a manner that at an intermediate position in a course of the abutment surfaces of the clamping portion and the clamped portion sliding relative to each other along the inclined surface via the biasing force of the helical compression spring, the surfaces of the width-across-flats parts abut on each other and movement of the washer to the one side is thereby prevented on one side of the shaft in the direction in which the surfaces of the width-across-flats parts face each other. The tilting mechanism is thereby configured in such a manner that the surfaces of the width-across-flats parts on the one side of the shaft in the direction in which the surfaces of the width-across-flats parts face each other are kept being pushed against and abutting on each other by the biasing force of the helical compression spring. At this time, it is possible that the clamped portion includes a linear portion that is pushed against and abuts on the other surface of the two surfaces forming the width-across-flats part of the shaft. Accordingly, the surface of the width-across-flats part of the shaft and the linear portion of the clamped portion are pushed against and abut on each other, enabling more reliably curbing rotation of the clamped portion around the axis of the shaft and thus enabling more reliably curbing rotation of the washer around the axis of the shaft.

In this invention, the tilting mechanism can be configured, for example, as follows. The washer includes a wall that rises upward from the entire outer circumference of the washer. A space on the inner circumferential side of the wall forms a plate receiving space that receives the plate. The washer includes an auxiliary tool disposed in the plate receiving space. The auxiliary tool is disposed between the outer circumferential surface of the plate and an inner wall surface of the wall and forms the clamping portion.

BRIEF DESCRIPTION OF THE DRAWINGS

FIGS. 8A to 8D are diagrams illustrating a process of assembling the washer and the plate to the shaft axle in Embodiment 1 in FIG. 4 and each illustrate a section along a plane that extends through a center axis of the shaft axle and that is orthogonal to surfaces of a width-across-flats part of the shaft axle, and from among these figures, FIG. 8A illustrates a first step (step of disposing the washer);

FIG. 8B illustrates a second step (step of compressing a helical compression spring) following the step of FIG. 8A;

FIG. 8C illustrates a third step (step of inserting the plate) following the step of FIG. 8B;

FIG. 8D illustrates a fourth step (state in which the assembling of the washer and the plate is completed after the helical compression spring being released from the compression) following the step of FIG. 8C;

FIGS. 9A and 9B are diagrams illustrating a state in which the assembling of the washer and the plate to the shaft axle is completed in Embodiment 1 in FIG. 4, and from among these figures, FIG. 9A is a sectional view along a plane that extends through the center axis of the shaft axle and that is orthogonal to the surfaces of the width-across-flats part of the shaft axle;

FIG. 9B is a sectional view at a position rotated by 90 degrees around the center axis 30 from the position of the section in FIG. 9A in the assembling completed state in FIG. 9A;

DETAILED DESCRIPTION OF THE PREFERRED EMBODIMENTS

Figure 2:
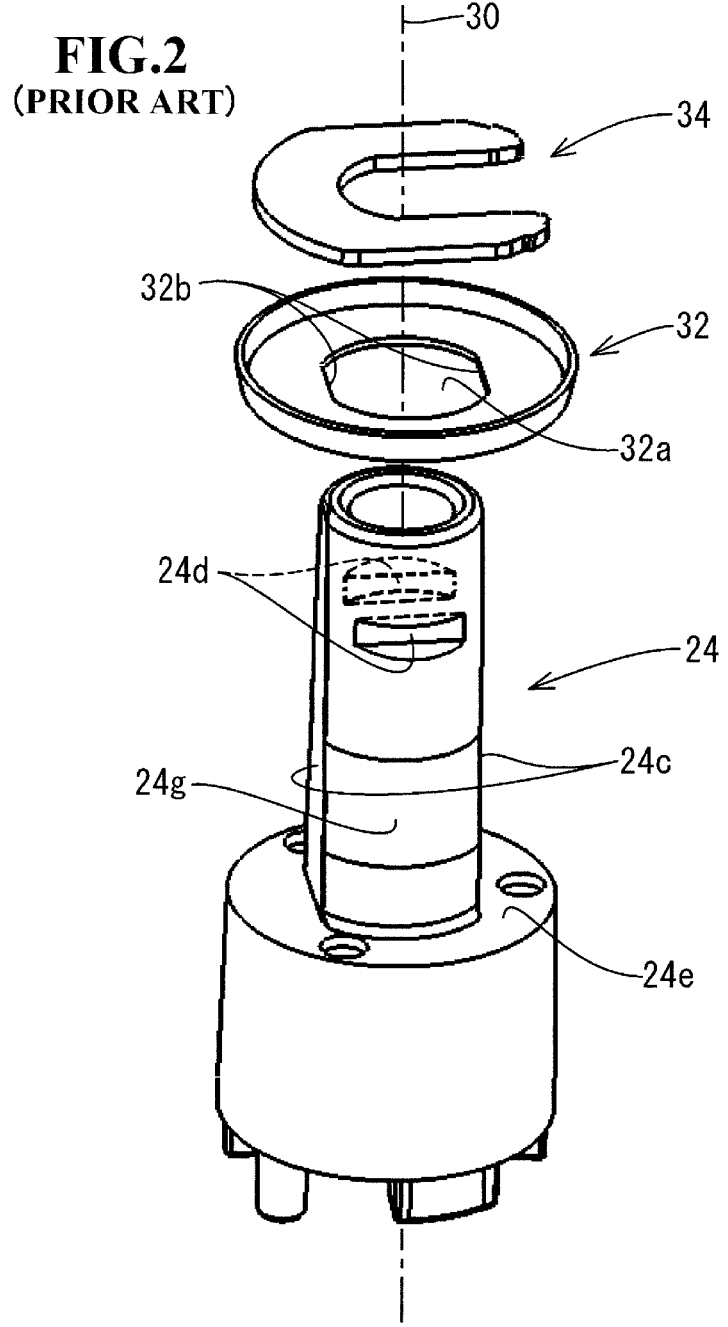
FIG. 2 is an exploded perspective view illustrating an example of a mechanism of the periphery of a shaft of a tilting mechanism in a conventional manually retractable door mirror.
Figure 3A:
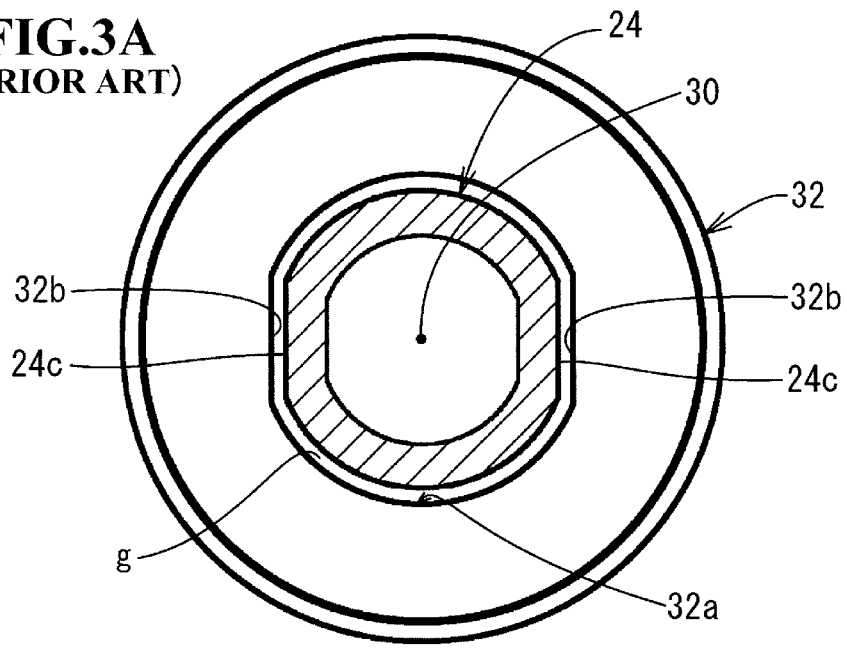
FIG. 3A is a sectional view in the direction orthogonal to the axis at a position, in the axis direction of the shaft, at which the washer is present in a state in which the manually retractable door mirror including the tilting mechanism in FIG. 2 is assembled, and indicates a positional relationship between the washer and the shaft at the position before a rotating section is rotated.
Figure 3B:
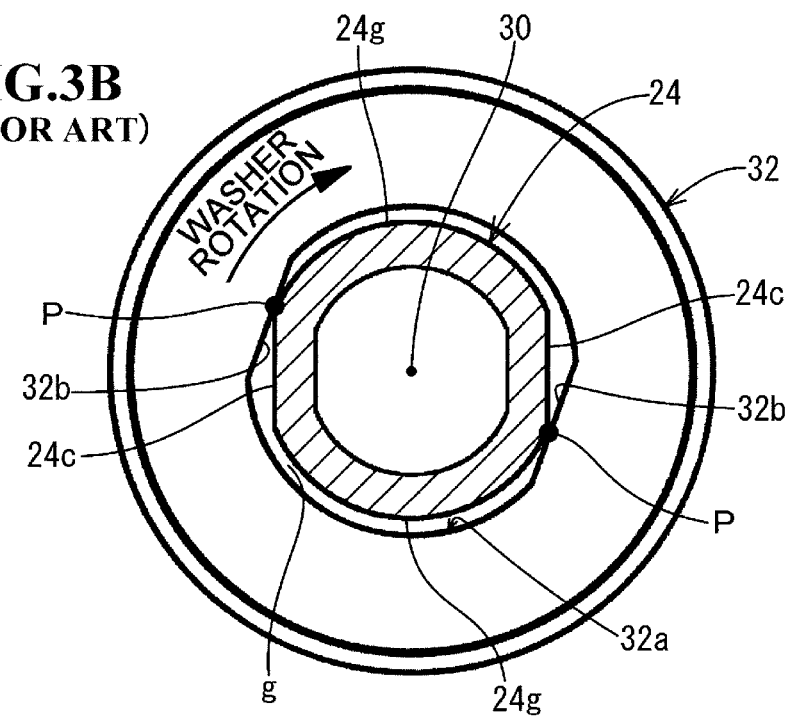
FIG. 3B is a sectional view in a sectional direction that is the same as that in FIG. 3A at a position that is the same as that in FIG. 3A, and indicates a positional relationship between the washer and the shaft when the rotating section is rotated from the state in FIG. 3A.

Various embodiments of this invention will be described below. In the below embodiments, for portions corresponding to those of the conventional structure in FIGS. 2, 3A and 3B, reference signs that are the same as those of the conventional structure are used. Also, between the embodiments, for each portion that corresponds to each other, a same reference sign is used, respectively.

Embodiment 1

Figure 4:
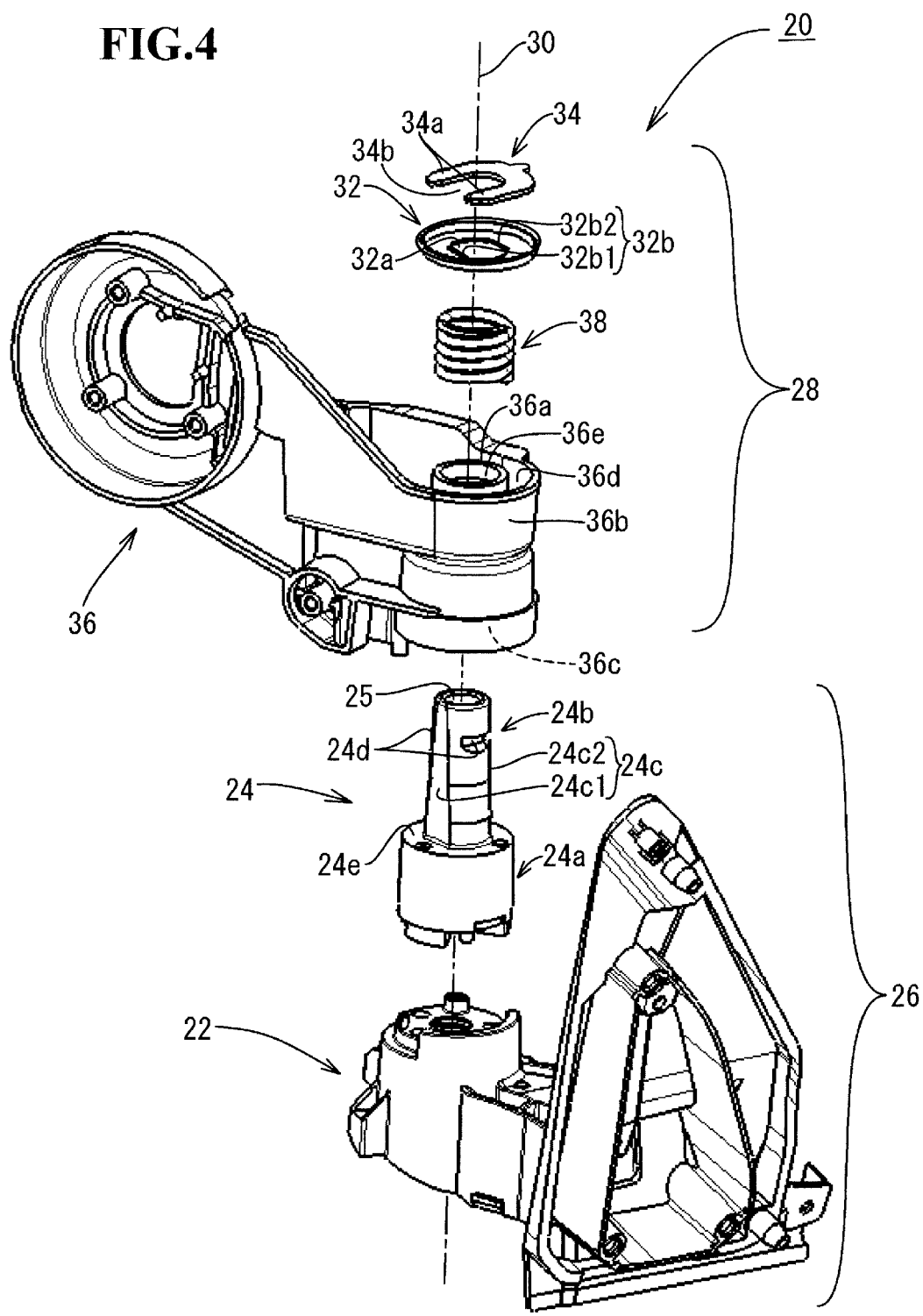
FIG. 4 is a diagram illustrating Embodiment 1 of this invention and is an exploded perspective view of a door mirror to which this invention is applied.

Embodiment 1 of this invention will be described. FIG. 4 illustrates a door mirror 20 to which this invention is applied, in an exploded manner. The door mirror 20 has the following configuration. A base 22 is a component to be attached to a door of a vehicle body and is formed of, e.g., a die casting of, e.g., zinc or aluminum or a hard resin (e.g., a reinforced resin). A shaft 24 is fixed in a standing manner to the base 22 via screw fastening. The base 22 and the shaft 24 form a fixed portion 26 of the door mirror. Note that the base 22 and the shaft 24 may be formed as a single-piece structure by, e.g., monoblock casting or integral molding. Where the shaft 24 is integrated with the base 22, the shaft 24 is formed of a material that is the same as that of the base 22. Where the shaft 24 is separated from the base 22, the shaft 24 is formed of, e.g., a die casting of, e.g., zinc or aluminum or a hard resin (reinforced resin).

The shaft 24 here has a single-piece structure in which a large-diameter shaft base portion 24a on the lower side and a small-diameter shaft axle 24b on the upper side are disposed coaxially. A shape of a section orthogonal to an axis 30 of an outer circumferential surface of the shaft base portion 24a is a circular shape. A shape of a section orthogonal to an axis 30 of an outer circumferential surface of the shaft axle 24b is a circular shape except that a width-across-flats part 24c (different diameter portion of the shaft axle 24a) and grooves 24d each have a non-circular shape (linear shape). In the shaft 24, a through-hole 25 extending in an up-down direction along the axis 30 is formed. The shaft 24 is fixed in a standing manner to the base 22 via screw fastening at a lower surface of the shaft base portion 24a. The shaft axle 24b has a tapered shape because of, e.g., a draft. At positions in the outer circumferential surface of the shaft axle 24b, the positions being symmetrical to each other with respect to the axis 30 (which is a center axis of the shaft 24 and also a rotation axis of a rotating section 28) of the shaft 24, two surfaces forming the width-across-flats part 24c are formed in such a manner as to extend in the direction along the axis 30 of the shaft 24 (to be exact, be slightly inclined relative to the axis 30). In other words, the width-across-flats part 24c includes two surfaces (hereinafter referred to as "width-across-flats surfaces") 24c1, 24c2 obtained by cutting the outer circumferential surface of the shaft axle 24b along two planes substantially parallel to each other (to be exact, a distance between the two planes increases toward the lower side in such a manner as to conform to the tapered shape of the shaft axle 24b). The width-across-flats part 24c engages with a width-across-flats part 32b of a center hole 32a of a later-described washer 32 and serves to prevent rotation of the washer 32 around the axis 30 relative to the shaft 24. Also, at positions in an upper portion of the outer circumferential surface of the shaft axle 24b, the positions being symmetrical to each other with respect to the axis 30 of the shaft 24 (here, positions rotated by 90 degrees around the axis 30 relative to the width-across-flats part 24c), the two grooves 24d to which a later-described plate 34 is inserted are formed in such a manner as to extend in a direction orthogonal to the axis 30.

A frame 36 of the rotating section 28 is supported on the shaft 24 in such a manner as to be rotatable around the axis 30. The axis 30 of the shaft 24 corresponds to the rotation axis of the rotating section 28. The frame 36 is formed of an integral molding product of, e.g., a die casting of, e.g., zinc or aluminum or a hard resin (reinforced resin). A non-illustrated mirror plate forming a view section body is attached to a front surface on the free-end side (side away from the axis 30) of the frame 36 via a non-illustrated mirror actuator. The mirror actuator adjusts a mirror angle in respective directions, upward, downward, rightward and leftward by means of motor driving, via remote control from the inside of the vehicle. On the proximal end side (side close to the axis 30) of the frame 36, an inner barrel 36a and an outer barrel 36b that extend in the up-down direction are formed coaxially. The inner barrel 36a and the outer barrel 36b are joined to each other via a bottom plate 36c (FIGS. 9A and 9B) at respective lower portions thereof. A cylindrical space 36d formed between the inner barrel 36a and the outer barrel 36b is closed by the bottom plate 36c. A columnar space 36e formed on the inner circumferential side of the inner barrel 36a forms a through-hole extending through the frame 36 in the up-down direction. The shaft axle 24b is inserted to the columnar space 36e from below. An upper portion of the shaft axle 24b projects upward from an upper end of the inner barrel 36a and is exposed to an outer space. An entire lower surface of the bottom plate 36c (FIGS. 9A and 9B) between the inner barrel 36a and the outer barrel 36b of the frame 36 is placed and supported on an upper surface 24e of the shaft base portion 24a and an entire inner circumferential surface of the columnar space 36e of the frame 36 is supported in such a manner as to be rotatable around the axis 30 of the shaft 24. A non-illustrated visor (also called a mirror housing) is fitted to the frame 36 in such a manner as to cover the frame 36. The frame 36 mounted with the mirror actuator, the mirror plate and the visor forms the rotating section 28 of the door mirror.

A helical compression spring 38 is received and disposed in a compressible/expandable manner in the cylindrical space 36d of the frame 36 coaxially with the shaft 24 (FIGS. 9A and 9B). Consequently, the helical compression spring 38 is fitted onto the shaft axle 24b in a compressible/expandable manner. A lower end surface of the helical compression spring 38 is placed and supported on an upper surface of the bottom plate 36c (bottom surface of the cylindrical space 36d) (FIGS. 9A and 9B) between the inner barrel 36a and the outer barrel 36b. In a state in which the shaft axle 24b is inserted in the columnar space 36e and the helical compression spring 38 is received and disposed in the cylindrical space 36d, the ring-like washer 32 is fitted onto the shaft axle 24b projecting upward from the upper end of the inner barrel 36a, in such a manner as to be capable of moving up and down. In other words, the washer 32 is fitted onto the shaft axle 24b by inserting the shaft axle 24b to the center hole 32a of the washer 32 on the upper side of the helical compression spring 38 (free-end side of the shaft axle 24b). The washer 32 is placed and supported on an upper end surface of the helical compression spring 38. In an inner circumferential surface of the center hole 32a of the washer 32, two surfaces forming the width-across-flats part 32b are formed at respective positions symmetrical to each other with respect to a center axis of the center hole 32a. In other words, the width-across-flats part 32b includes two surfaces 32b1, 32b2 (hereinafter referred to as "width-across-flats surfaces") obtained by cutting the inner circumferential surface of the center hole 32a along two parallel planes. In a position in which the width-across-flats parts 24c, 32b of the shaft axle 24b and the washer 32 face each other, the position being a relative rotation angle position between the shaft axle 24b and the washer 32 in a direction around the axis 30, the shaft axle 24b can be inserted to the center hole 32a of the washer 32. In a state in which the washer 32 is fitted onto the shaft axle 24b, rotation of the washer 32 around the axis 30 relative to the shaft axle 24b is restricted by engagement between the width-across-flats parts 24c, 32b. In other words, the width-across-flats parts 24c, 32b form a rotation preventing mechanism that prevents the washer 32 from rotating free around the axis 30 even in a state in which the washer 32 is not biased by the helical compression spring 38.

In a state in which the washer 32 is fitted onto the shaft axle 24b on the upper side of the helical compression spring 38, the plate 34 having a U-shape (U-plate) is attached to the shaft axle 24b. Attachment of the plate 34 to the shaft axle 24b is performed by depressing the washer 32 against a spring force of the helical compression spring 38 to compress the helical compression spring 38 and inserting the plate 34 to the two grooves 24d in opposite side surfaces of the shaft axle 24b from a lateral side of the shaft axle 24b on the upper side of the washer 32 (free-end side of the shaft axle 24b). In other words, the plate 34 is attached to the shaft axle 24b by parallel portions 34a, 34a of the plate 34 being inserted to and slid in the grooves 24d, 24d of the shaft axle 24b to make the shaft axle 24b enter an opening 34b of the plate 34. Consequently, upward movement of the washer 32 is prevented by the plate 34. Upon the helical compression spring 38 being released from the depression (compression) in this state, a biasing force of the helical compression spring 38 is imposed between the bottom plate 36c of the frame 36 and the washer 32 (FIGS. 9A and 9B) and such biasing force-imposed state is held. The biasing force acts as a pushing force that pushes the rotating section 28 against the fixed portion 26 along the axis 30. In each of respective surfaces of the rotating section 28 and the fixed portion 26, the surfaces abutting on each other (the lower surface of the bottom plate 36c of the frame 36 and the upper surface 24e of the shaft base portion 24a; see FIG. 9A and FIG. 9B) on which the pushing force acts, a non-illustrated projecting/recessed fitting structure is formed at regular intervals at a plurality of places along the direction around the rotation axis 30. The fitting structures are fitted together at least when the rotating section 28 is in a use position. The fitting urged by the helical compression spring 38 enables the rotating section 28 to be held in the use position. Also, the rotating section 28 can be rotated and moved toward a retracted position by undoing the fitting through application of a force of a value that is equal to or exceeds a predetermined value in a direction around the rotation axis 30 to the rotating section 28 in the use position. Alternatively, the rotating section 28 can be rotated and moved toward a forward-tilted position by undoing the fitting through application of a force of a value that is equal to or exceeds a predetermined value to the rotating section 28 in the use position in a reverse direction around the rotation axis.

Upon the rotating section 28 being manually rotated around the axis 30 in a state in which the door mirror 20 is assembled as above, the helical compression spring 38 rotates around the axis 30 together with the rotating section 28 because the lower end surface of the helical compression spring 38 abuts on the upper surface of the bottom plate 36c between the inner barrel 36a and the outer barrel 36b in a compressed state. On the other hand, the washer 32 is prevented from rotating relative to the shaft 24 because the width-across-flats parts 24c, 32b of the shaft 24 and the washer 32 engage with each other. Therefore, at this time, the helical compression spring 38 and the washer 32 rotates relative to each other around the axis 30 while slippage occurring between the upper end surface of the helical compression spring 38 and the lower surface of the washer 32.

Figure 5A:
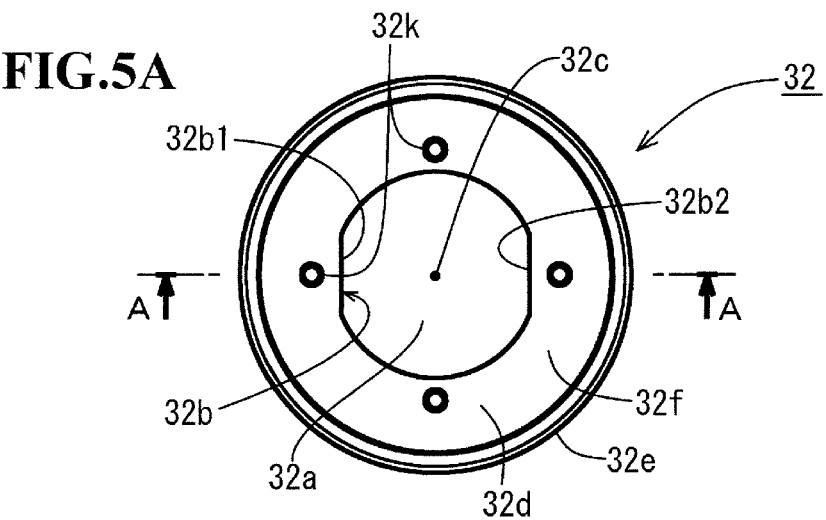
FIG. 5A is a plan view illustrating a detailed configuration of the washer in FIG. 4.

A detailed configuration of the washer 32 in FIG. 4 will be described with reference to FIGS. 5A to 5C. The washer 32 is manufactured by stamping a metal plate of, e.g., an iron alloy. As illustrated in FIG. 5A, a plan shape (outer shape) of the washer 32 is a circular shape and the center hole 32a is formed at a center portion of the plane. In the inner circumferential surface of the center hole 32a, the width-across-flats part 32b (different diameter portion of the center hole 32a of the washer 32) including the width-across-flats surfaces 32b1, 32b2 obtained by cutting the inner circumferential surface along parallel planes is formed at the respective positions symmetrical to each other with respect to the center axis 32c (corresponding to a center axis of the washer 32) of the center hole 32a. The inner circumferential surface of the center hole 32 has a circular shape with the center axis 32c as a center except that the width-across-flats part 32b has a non-circular shape (linear shape). A size (diameter) of the center hole 32a is set as a size that allows occurrence of a relatively large gap between the outer circumferential surface of the shaft axle 24b and the inner circumferential surface of the center hole 32a in an entire circumference thereof at a predetermined height position (that is, a position at which the washer 32 fitted onto the shaft axle 24b is locked by the plate 34) in the direction along the axis 30. In other words, as described above, the shaft axle 24b has a tapered shape because of, e.g., a draft. On the other hand, in a process of assembling the door mirror 20, when the plate 34 is inserted to the grooves 24d of the shaft axle 24b, it is necessary to lower the washer 32 to a position at which the plate 34 can be inserted to the grooves 24d. In order to enable to lower the washer 32 to the intended lowering position relative to the shaft axle 24b having a tapered shape, the center hole 32a has a size set according to a thickness at the intended lowering position of the shaft axle 24b. As a result, in a state in which the door mirror 20 is assembled (in a state in which the washer 32 is raised to the upper portion of the shaft axle 24b), a relatively large gap occurs between the outer circumferential surface of the upper portion of the shaft axle 24b and the inner circumferential surface of the center hole 32a of the washer 32.

Figure 5B:
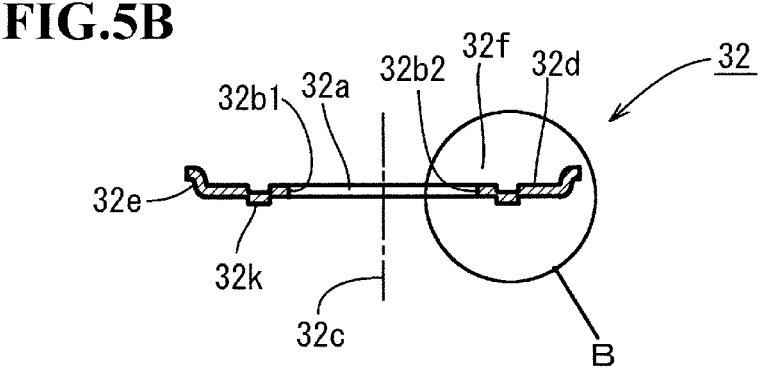
FIG. 5B is a sectional view along the line indicated by arrows A-A in FIG. 5A.
Figure 5C:
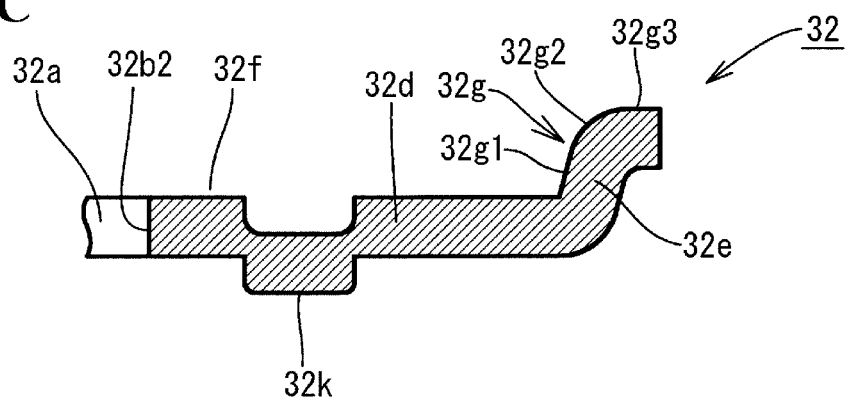
FIG. 5C is an enlarged view of part B in FIG. 5B.

As illustrated in FIG. 5B, the washer 32 includes a planar portion 32d forming the center portion, and a wall 32e erected upward from an entire outer circumference of the planar portion 32d. A space on the inner circumferential side of the wall 32e forms a plate receiving space 32f that receives the plate 34. A sectional shape of an inner wall surface 32g of the wall 32e is formed as illustrated in an enlarged manner in FIG. 5C. In other words, the inner wall surface 32g includes an inclined surface 32g1, a round surface 32g2 and a flat surface 32g3. The inclined surface 32g1 rises obliquely upward from an outer circumferential edge of the planar portion 32d. The round surface 32g2 is formed in such a manner that the inclination gradually becomes gentle from an upper portion of the inclined surface 32g1. The flat surface 32g3 is formed in such a manner as to extend continuously from the outer circumferential side of the round surface 32g2 to an outermost circumferential position of the washer 32 in parallel with the planar portion 32d. As described later, such shape of the inner wall surface 32g makes it easy for the plate 34 to be drawn into the plate receiving space 32f via the biasing force of the helical compression spring 38.

Four axis displacement preventing lugs 32k are formed in a projecting manner at regular intervals in a circumferential direction with the center axis 32c of the washer 32 as a center at a lower surface of the planar portion 32d of the washer 32. The axis displacement preventing lugs 32k are disposed at respective positions closer to an inner circumferential surface of an opening at a center of the upper end surface of the helical compression spring 38 abutting on the lower surface of the washer 32 (FIGS. 9A and 9B). The axis displacement preventing lugs 32k serve to prevent axis displacement of the helical compression spring 38 (displacement of the center axis of the helical compression spring 38 from the center axis 30 of the shaft 24). Note that in the figures except FIGS. 5A, 5B, 5C, 9A and 9B, illustration of the axis displacement preventing lugs 32k is omitted.

Figure 6A:
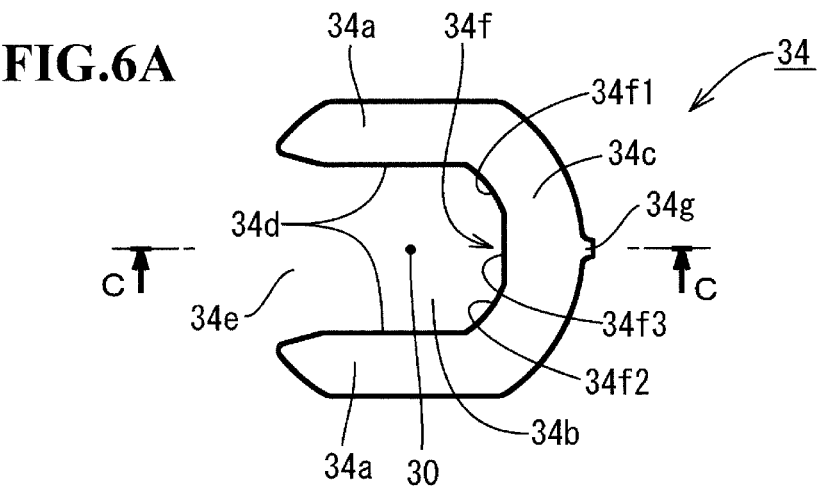
FIG. 6A is a plan view illustrating a detailed configuration of the plate in FIG. 4.
Figure 6B:
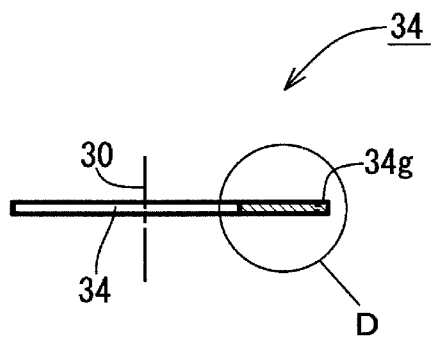
FIG. 6B is a sectional view along the line indicated by arrows C-C in FIG. 6A.
Figure 6C:
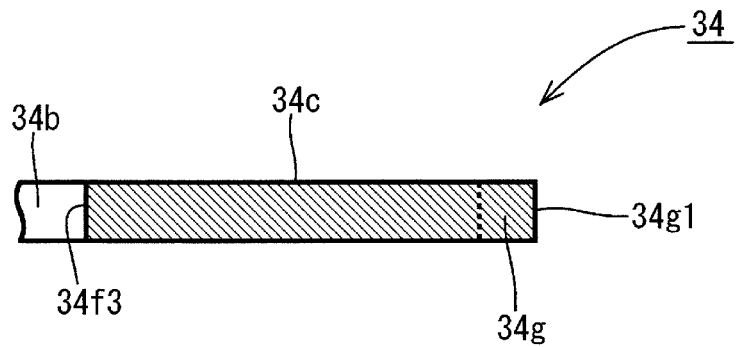
FIG. 6C is an enlarged view of part D in FIG. 6B.

A detailed configuration of the plate 34 in FIG. 4 will be described with reference to FIGS. 6A to 6C. The plate 34 is formed in a flat plate shape having a uniform thickness in its entirety by die-cutting a metal plate of, e.g., an iron alloy, which is the same as that of the washer 32, via stamping. As illustrated in FIG. 6A, a plan shape of the plate 34 is a substantially U-shape. In other words, the plate 34 includes two parallel portions 34a, 34a that are parallel to each other, and an arc-like portion 34c connecting respective one ends of the parallel portions 34a, 34a in an arc-like manner. The plate 34 includes an opening 34b surrounded by a parallel portion 34a, the arc-like portion 34c and a parallel portion 34a. The opening 34b opens on the free-end side of the parallel portions 34a, 34a and forms an entrance 34e from which the shaft axle 24b enters. While inserting opposed edges 34d, 34d of the parallel portions 34a, 34a, the opposed edges 34d, 34d being parallel to each other, to the grooves 24d, 24d (FIG. 4) of the shaft axle 24b, the shaft axle 24b is made to enter the opening 34b from the entrance 34e. As a result, the shaft axle 24b is received in the opening 34b in a state in which the parallel portions 34a, 34a engage with the grooves 24d, 24d. Consequently, the plate 34 is attached to the shaft axle 24b and is prevented from moving along the axis 30. A width of the opening 34b (distance between the opposed edges 34d, 34d) is slightly larger than an outer dimension of a part of the shaft axle 24b, the part being received in the opening 34b (distance between bottoms 24d1, 24d1 of the grooves 24d, 24d; see FIG. 7). Therefore, the plate 34 cannot substantially rotate around the axis 30 of the shaft axle 24b.

Figure 1A:
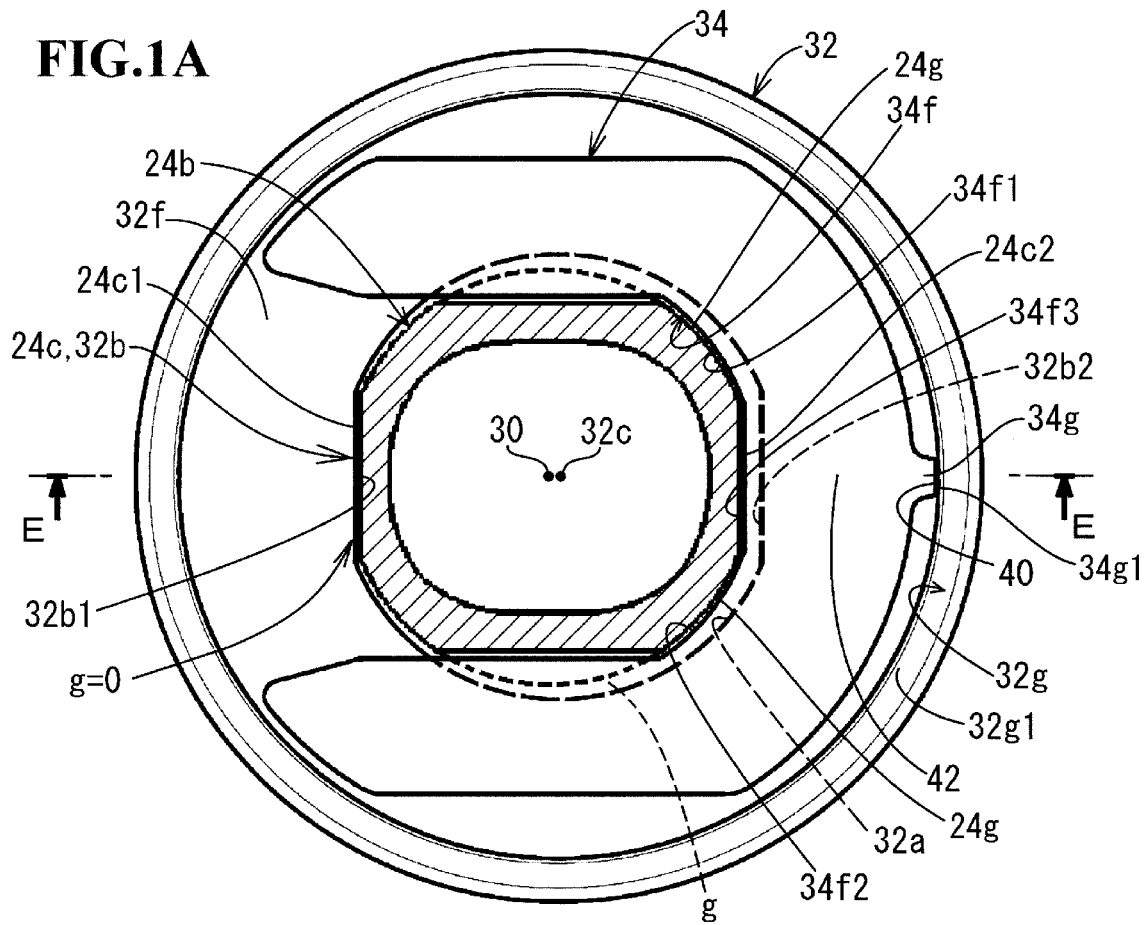
FIG. 1A is a diagram illustrating a state (state in an actual use) in which a washer and a plate are assembled to a shaft axle in Embodiment 1 in FIG. 4 and is a sectional view in a direction orthogonal to the axis at a position, in an axis direction of the shaft axle, at which the washer and the plate are present.
Figure 1B:
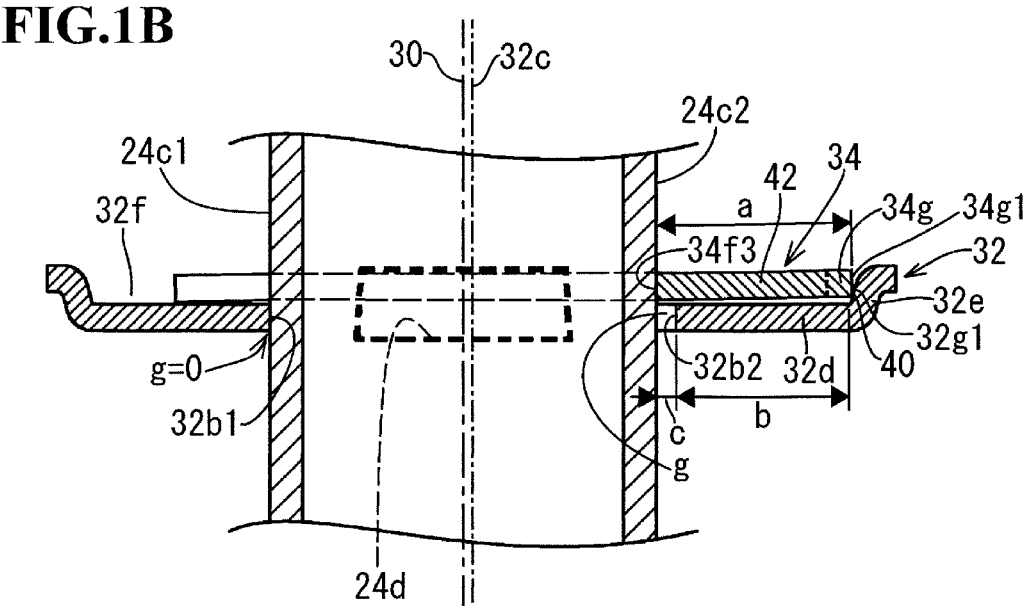
FIG. 1B is a sectional view along the line indicated by arrows E-E in FIG. 1A.

An inner circumferential surface 34f of the arc-like portion 34c is formed in such a manner as to conform to a shape of the outer circumferential surface of the shaft axle 24b at a position at which the plate 34 is attached to the shaft axle 24b. In other words, the inner circumferential surface 34f of the arc-like portion 34c is formed of circular arc portions 34f1, 34f2 on both sides and a linear portion 34f3 connecting the circular arc portions 34f1, 34f2. Outer ends of the circular arc portions 34f1, 34f2 are connected to the opposed edges 34d, 34d, respectively. In a state in which the washer 32 and the plate 34 are attached to the shaft axle 24b and thus biased by the helical compression spring 38, the linear portion 34f3 is pushed against and abuts on the width-across-flats surface 24c2 (planar surface) of the shaft axle 24b parallelly and closely (FIGS. 1A and 1B). Consequently, backlash of the plate 34 in a direction around the axis 30 of the shaft axle 24b is reliably prevented. At this time, the circular arc portions 34f1, 34f2 face the circular portions 24g (circular arc-like outer circumferential surfaces) on both outer sides of the width-across-flats surface 24c2 of the shaft axle 24b substantially with no gap therebetween (FIG. 1A).

At a center position in a circumferential direction in an outer circumferential surface of the arc-like portion 34c of the plate 34, a plate-side lug 34g is formed in such a manner as to project outward in a radial direction of the plate 34. The plate-side lug 34g forms a part of a deviation mechanism. In Embodiment 1, as illustrated in FIG. 6C, a distal end surface 34g1 of the plate-side lug 34g is formed as a surface perpendicular to the plane of the plate 34.

Figure 7:
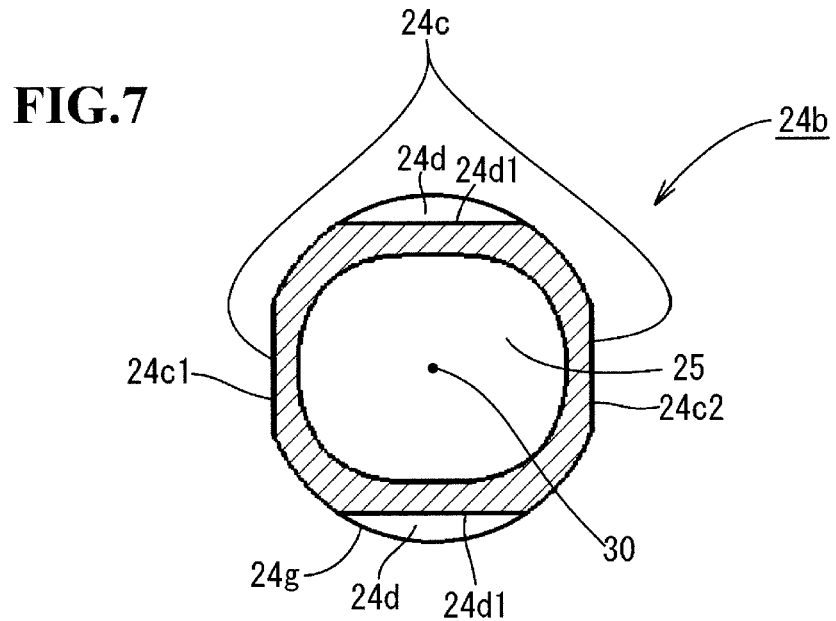
FIG. 7 is a sectional view of the shaft axle in FIG. 4 cut at a position of grooves to which the plate is attached, along a plane orthogonal to the axis of the shaft axle.

A shape of a section orthogonal to the axis 30 of the shaft axle 24b at the position of the grooves 24d in FIG. 4, will be described with reference to FIG. 7. A shape of a section orthogonal to the axis 30 of the outer circumferential surface of the shaft axle 24b is a circular shape (circular portion 24g) except the width-across-flats part 24c and the grooves 24d. Respective sectional shapes of the width-across-flats surfaces 24c1, 24c2 are mutually parallel linear lines disposed at respective positions symmetrical to each other with respect to the axis 30. Respective sectional shapes of the bottoms 24d1, 24d1 of the grooves 24d, 24d are mutually parallel linear lines disposed at respective positions symmetrical to each other with respect to the axis 30. The sectional shapes of the width-across-flats surfaces 24c1, 24c2 and the sectional shapes of the bottom 24d1, 24d1 of the grooves 24d, 24d extend in respective directions orthogonal to each other. The through-hole 25 extending in the up-down direction through the entirety of the shaft 24 is formed in the shaft axle 24b. A cable for power supply to the mirror actuator or the like is inserted the through-hole 25.

Here, a process of assembling the washer 32 and the plate 34 to the shaft axle 24b will be described with reference to FIGS. 8A to 8D. Note that in FIGS. 8A to 8D, illustration of the helical compression spring 38 and the frame 36 is omitted.

Figure 8A:
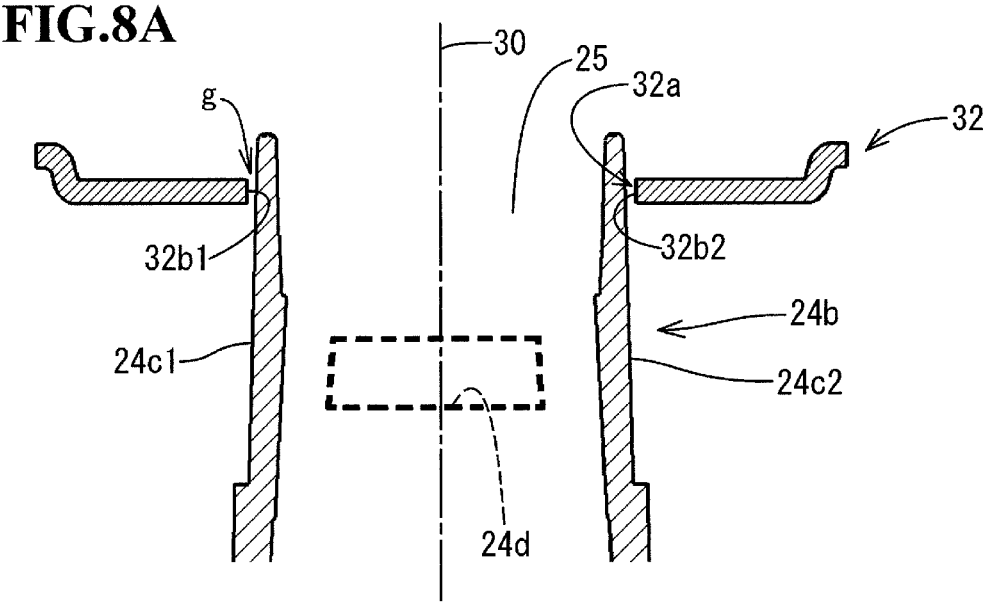

(First Step: FIG. 8A)

The shaft axle 24b is inserted through the columnar space 36e (FIG. 4) of the frame 36 to make the frame 36 be supported on the shaft 24, and the helical compression spring 38 is put in the cylindrical space 36d of the frame 36.

In this state, the shaft axle 24b is inserted through the center hole 32a of the washer 32 and the washer 32 is placed and supported on the upper end surface of the helical compression spring 38. A gap g is formed between the inner circumferential surface of the center hole 32a of the washer 32 and the outer circumferential surface of the shaft axle 24b. The gap is intended to, when the plate 34 is inserted to the grooves 24d, allow the washer 32 to be lowered sufficiently below the position of the grooves 24d of the shaft axle 24b whose thickness increasing on the lower side.

(Second Step: FIG. 8B)

The washer 32 is depressed to compress the helical compression spring 38. The compression stops at the position at which the washer 32 is locked by steps 24f at respective lower ends of the width-across-flats surfaces 24c1, 24c2 of the shaft axle 24b.

(Third Step: FIG. 8C)

The plate 34 is inserted to the grooves 24d from the lateral side of the shaft axle 24b.

(Fourth Step: FIG. 8D)

The helical compression spring 38 is released from the compression. Consequently, the washer 32 is pushed upward by the biasing force of the helical compression spring 38 and is pushed against and abuts on the plate 34 and is thereby locked by the plate 34. The plate 34 is received in the plate receiving space 32f on the upper surface of the washer 32. As described with reference to FIG. 5C, the round surface 32g2 and the inclined surface 32g1 are formed from the upper side in the inner wall surface 32g of the wall 32e of the washer 32, and thus, the plate 34 can easily be drawn into (guided to) the plate receiving space 32f by the biasing force of the helical compression spring 38. The assembling of the washer 32 and the plate 34 to the shaft axle 24b is completed as above.

FIGS. 9A and 9B illustrate a state in which the assembling of the washer 32 and the plate 34 to the shaft axle 24b is completed, with the helical compression spring 38 and the frame 36 included. FIG. 9A illustrates a section along a plane that extends through the center axis 30 of the shaft axle 24b and that is orthogonal to the width-across-flats surfaces 24c1, 24c2 of the shaft axle 24b. FIG. 9B illustrates a section at a position rotated by 90 degrees around the center axis 30 from the position of the section in FIG. 9A. The helical compression spring 38 is disposed in a compressed state between the bottom surface of the cylindrical space 36d of the frame 36 (upper surface of the bottom plate 36c) and the lower surface of the washer 32. The washer 32 is pushed upward by the biasing force of the helical compression spring 38 and is locked by the plate 34. The lower surface of the bottom plate 36c between the inner barrel 36a and the outer barrel 36b of the frame 36 and the upper surface 24e of the shaft base portion 24a are pushed against and abut on each other via the biasing force of the helical compression spring 38. In each of the pushing and abutting surfaces, as described above, a projecting/recessed fitting structure for holding the frame 36 (rotating section 28) at least at the use position is formed along a direction around the rotation axis 30. Upon a force of a value that is equal to or exceeds a predetermined value being applied to the rotating section 28 in a direction around the rotation axis 30, fitting between projections and recesses is undone and the rotating section 28 thus rotates in a retraction direction or a forward-tilting direction. When the fitting between the projections and the recesses is undone, the frame 36 rises along the axis 30 relative to the shaft 24 by an amount corresponding to a height of the projections and the recesses, and when the projections and the recesses are fitted together again, the frame 36 is lowered by the amount corresponding to the height of the projections and the recesses.

FIGS. 1A and 1B indicate a positional relationship between the shaft axle 24b, the washer 32 and the plate 34 in a state in which the washer 32 and the plate 34 are assembled to the shaft axle 24b. The plate 34 is received in the plate receiving space 32f in the upper surface of the washer 32. The washer 32 is biased by the non-illustrated helical compression spring 38 and is locked by being pushed against and abuts on the plate 34. As illustrated in FIG. 1B, width "a" of the plate 34 at a circumferential position (that is, a position in the direction around the axis 30) at which the plate-side lug 34g is present is set as "a>b" in relation to width "b" of the planar portion 32d of the washer 32 at the circumferential position. Since there is the gap g between the shaft axle 24b and the center hole 32a of the washer 32, the washer 32 deviates toward the plate-side lug 34g relative to the shaft axle 24b because of the setting of the dimensions (that is, a>b). In other words, the center axis 32c of the washer 32 deviates rightward in FIGS. 1A and 1B relative to the axis 30 of the shaft axle 24b. That is to say, the center hole 32a of the washer 32 deviates toward the plate-side lug 34g relative to the shaft axle 24b. Consequently, the gap g at the width-across-flats part 24c of the shaft axle 24b becomes larger on the right side of the shaft axle 24b and becomes smaller on the left side as viewed in FIGS. 1A and 1B. Where "c" is a value of a sum of right and left parts of the gap g, in Embodiment 1, as illustrated in FIG. 1B, "a≥(b+c)" is set. As a result, on the left side of the shaft axle 24b, the width-across-flats surface 24c1 of the shaft axle 24b and the width-across-flats surface 32b1 of the washer 32 face each other in parallel and the gap g between the surfaces becomes zero (a state in which the width-across-flats surfaces 24c1, 32b1 abut on each other). Also, on the right side of the shaft axle 24b, the width-across-flats surface 24c2 of the shaft axle 24b and a surface of the linear portion 34f3 of the inner circumferential surface 34f of the plate 34 face each other in parallel and the gap between the surfaces becomes zero (a state in which the width-across-flats surface 24c2 and the linear portion 34f3 abut on each other). In other words, the shaft axle 24b is clamped by the width-across-flats surface 32b1 of the washer 32 on the left side of the shaft axle 24b and the surface of the linear portion 34f3 of the plate 34 on the right side of the shaft axle 24b from the left and right sides with the gap as zero (no gap) therebetween. The gap-zero state is maintained by the biasing force of the helical compression spring 38. Consequently, no rotation of the washer 32 relative to the shaft axle 24b along with rotation of the rotating section 28 (rotation described with reference to FIG. 3B) occurs. As a result, no rattling sound at the beginning of rotation of the rotating section 28 (e.g., rattling sound due to a collision between the outer circumferential surface of the shaft axle 24b and the inner circumferential surface of the center hole 32a of the washer 32 and sound of rubbing between the washer 32 and the plate 34) occurs. In other words, even if the rotating section 28 is rotated, no change occurs in the positional relationship of the respective portions in FIGS. 1A and 1B. In particular, where settings are made so that "a>(b+c)", the distal end surface 34g1 of the plate-side lug 34g is pushed against and abuts at an intermediate position in a height direction of the inclined surface 32g1 of the wall 32e of the washer 32 via the biasing force of the helical compression spring 38 and thereby held in a locked state (as a result, the plate 34 is slightly inclined relative to the washer 32). As a result, the width-across-flats surfaces 24c1 of the shaft axle 24b and the width-across-flats surfaces 32b1 of the washer 32 are closely pushed against and abut on each other on the left side of the shaft axle 24*b*, and the width-across-flats surface 24*c*2 of the shaft axle 24*b* and the surface of the linear portion 34*f*3 of the inner circumferential surface 34*f* of the plate 34 are closely pushed against and abut on each other on the right side of the shaft axle 24*b*. In other words, the width-across-flats part 24*c* of the shaft axle 24*b* is clamped by the width-across-flats surface 32*b*1 of the washer 32 on the left side of the shaft axle 24*b* and the surface of the linear portion 34*f*3 of the plate 34 on the right side of the shaft axle 24*b* from the left and right sides via the biasing force of the helical compression spring 38. Therefore, even if there are some errors in dimensions a, b, c due to tolerance, and also, even if some changes occur in dimensions a, b, c due to aging, a distal end of the plate-side lug 34*g* is lowered along the inclined surface 32*g*1 of the wall 32*e* of the washer 32 by the biasing force of the helical compression spring 38 and the dimension change is thereby absorbed. As a result, it is possible to maintain the gap g between the width-across-flats surfaces 24*c*1, 32*b*1 on the left side as zero. Note that where the settings are made so that "a<(b+c)", there is a possibility that the gap g between the width-across-flats surfaces 24*c*1, 32*b*1 on the left side become not zero; however, as long as "a>b", the gap g between the width-across-flats surfaces 24*c*1, 32*b*1 on the left side can be decreased in comparison with the case where "a<b" (conventional design illustrated in FIGS. 2 to 3B). As a result, rattling sound at the beginning of rotation of the rotating section 28 can be decreased in comparison with the conventional design. Therefore, an effect of decrease of rattling sound at the beginning of rotation can be provided as long as the relationship among dimensions a, b, c is set as any of the following.

"(b+c)>a>b": rattling sound at the beginning of rotation can be decreased in comparison with the conventional design.

"a=(b+c)": rattling sound at the beginning of rotation can be made to zero.

"a>(b+c)": rattling sound at the beginning of rotation can be maintained as zero through absorption of, e.g., tolerance and/or dimensional change due aging.

In Embodiment 1, the "clamping portion" and the "clamped portion" of this invention correspond to the following parts in FIG. 1A, respectively. A clamping portion 40 corresponds to a part of the inner wall surface 32*g* of the wall 32*e* of the washer 32, the part being in abutment with the plate-side lug 34*g*. A clamped portion 42 corresponds to a region of the plate 34, the region extending from the plate-side lug 34*g* to the linear portion 34*f*3 of the inner circumferential surface 34*f*. In other words, a region of the plate 34, the region being located between the clamping portion 40 of the washer 32 and the width-across-flats surface 24*c*2 on the right side of the shaft axle 24*b*, corresponds to the clamped portion 42. The clamped portion 42 restricts a distance between the clamping portion 40 of the washer 32 and the width-across-flats surface 24*c*2 on the right side of the shaft axle 24*b* from being decreased to be smaller than dimension a in FIG. 1B and thereby prevents an increase of the gap g between the width-across-flats surfaces 24*c*1, 32*b*1 on the left side.

Embodiment 2

Figure 10:
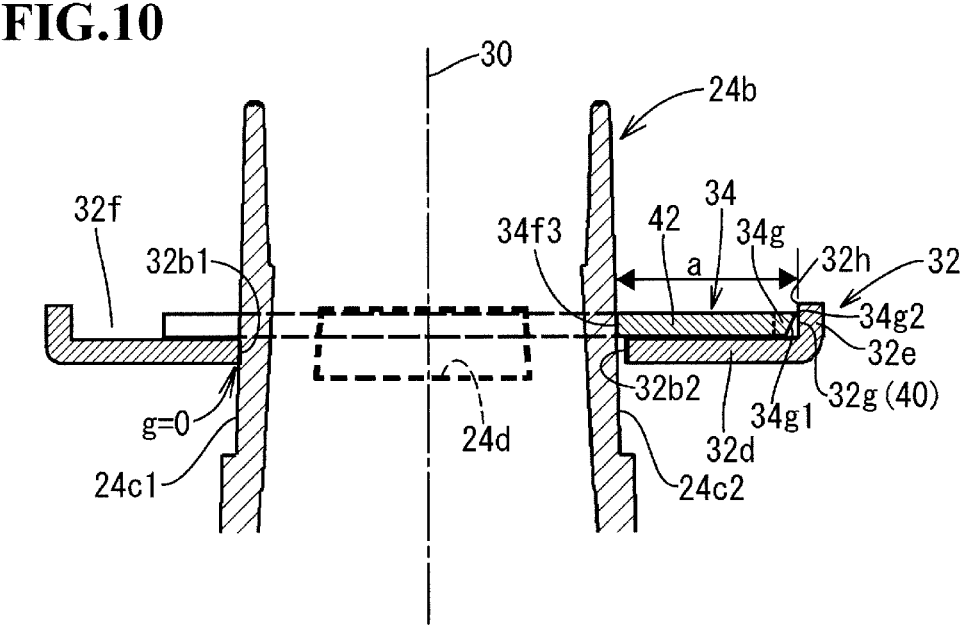
FIG. 10 is a sectional view illustrating Embodiment 2 of this invention and illustrates a section at a position that is the same as that of FIG. 1B relating to Embodiment 1.

FIG. 10 illustrates Embodiment 2 of this invention. Embodiment 2 is one obtained by making change of a sectional shape of the wall 32*e* of the washer 32 and a shape of the distal end surface 34*g*1 of the plate-side lug 34*g* of the plate 34 with respect to Embodiment 1. The rest of Embodiment 2 is the same as that of Embodiment 1. FIG. 10 illustrates a section at a position that is the same as that of FIG. 1B. In Embodiment 2, a wall 32*e* of a washer 32 has a sectional shape rises upwardly and perpendicularly from an entire outer circumference of a planar portion 32*d*. Therefore, an inner wall surface 32*g* of the wall 32*e* forms a surface erected relative to the planar portion 32*d*. A space on the inner circumferential side of the wall 32*e* forms a plate receiving space 32*f* that receives a plate 34. A distal end surface 34*g*1 of a plate-side lug 34*g* of the plate 34 is inclined in such a manner as to face obliquely downward. Assembling of the washer 32 and the plate 34 to the shaft axle 24*b* can be performed in a manner that is similar to that of Embodiment 1 described with reference to FIGS. 8A to 8D (first to fourth steps). At this time, in the fourth step corresponding to FIG. 8D, the following operation occurs. Upon the helical compression spring 38 being released from compression, the obliquely downwardly inclined distal end surface 34*g*1 of the plate-side lug 34*g* abuts against an inner circumferential-side corner 32*h* of an upper end surface of the wall 32*e* of the washer 32. As the plate 34 is lowered relative to the washer 32 by the biasing force of the helical compression spring 38, the washer 32 slides rightward in FIG. 10 relative to a shaft axle 24*b* because of sliding between the corner 32*h* and the inclined distal end surface 34*g*1. Consequently, the plate 34 is drawn into the plate receiving space 32*f* and finally reaches the state illustrated in FIG. 10. The assembling is completed as above. In the assembling completed state, the abutment between the corner 32*h* and the inclined distal end surface 34*g*1 is undone, and instead, an upper corner 34*g*2 of the distal end surface 34*g*1 and the erected inner wall surface 32*g* of the wall 32*e* of the washer 32 abut against each other. It is possible that the assembling is not completed in a state in which the plate 34 is completely received in the plate receiving space 32*f* like in FIG. 10 but is completed in a state in which the corner 32*h* abuts at an intermediate position on the inclined distal end surface 34*g*1 (semi-fitted state in which the plate 34 is incompletely received in the plate receiving space 32*f*) by setting dimension a of the plate 34 as being slightly longer. Consequently, like that described in Embodiment 1, a structure that enables absorbing, e.g., tolerance and/or dimensional change due to aging can be provided.

Embodiment 3

Figure 11:
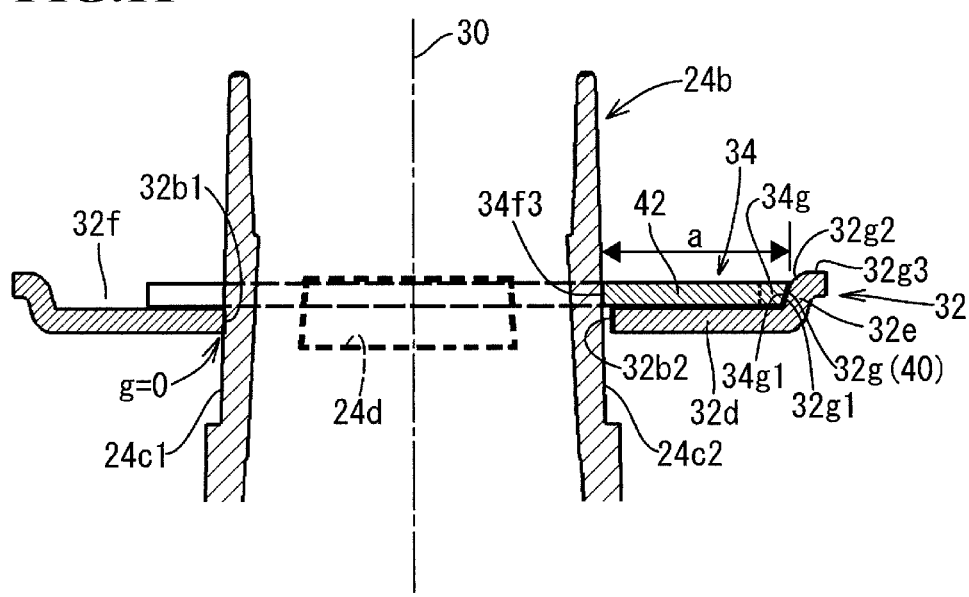
FIG. 11 is a sectional view illustrating Embodiment 3 of this invention and illustrates a section at a position that is the same as that in FIG. 1B relating to Embodiment 1.

FIG. 11 illustrates Embodiment 3 of this invention. Embodiment 3 is one obtained by making change of a shape of the distal end surface 34*g*1 of the plate-side lug 34*g* of the plate 34 with respect to Embodiment 1. The rest of Embodiment 3 is the same as that of Embodiment 1. FIG. 11 illustrates a section at a position that is the same as that of FIG. 1B. In Embodiment 3, a wall 32*e* of a washer 32 has a sectional shape that is the same as that of the wall 32*e* of Embodiment 1, which is illustrated in FIG. 5C. In other words, the inner wall surface 32*g* of the wall 32*e* includes an inclined surface 32*g*1 that rises obliquely upward from an outer circumferential edge of a planar portion 32*d*, a round surface 32*g*2 formed in such a manner that the inclination gradually becomes gentle from an upper portion of the inclined surface 32*g*1, and a flat surface 32*g*3 formed in such a manner as to extend continuously from the outer circumferential side of the round surface 32*g*2 to an outermost circumferential position of the washer 32 in parallel with the planar portion 32*d*. On the other hand, a distal end surface 34*g*1 of a plate-side lug 34*g* of the plate 34 is inclined in such a manner as to face obliquely downward. Respective inclination angles of the inclined surfaces 32g1, 34g1 are set as being equal to each other. Assembling of the washer 32 and the plate 34 to a shaft axle 24b can be performed in a manner that is similar to that of Embodiment 1 described with reference to FIGS. 8A to 8D (first to fourth steps). At this time, in the fourth step corresponding to FIG. 8D, the following operation occurs. Upon the helical compression spring 38 being released from compression, the inclined surfaces 32g1, 34g1 abut on each other. The inclined surfaces 32g1, 34g1 slide on each other via the biasing force of the helical compression spring 38 and the plate 34 is thereby lowered relative to the washer 32. As the plate 34 is lowered, the washer 32 slides rightward in FIG. 11 relative to the shaft axle 24b. Consequently, the plate 34 is drawn into a plate receiving space 32f and finally reaches the state illustrated in FIG. 11. The assembling is completed as above. It is possible that the assembling is not completed in a state in which the plate 34 is completely received in the plate receiving space 32f like in FIG. 11 but is completed in a state in which the inclined surface 34g1 is located at an intermediate position in the course of the inclined surface 34g1 being completely slid down on the inclined surface 32g1 (state in which the plate 34 is incompletely received in the plate receiving space 32f) by setting dimension a of the plate 34 as being slightly longer. Consequently, like that described in Embodiment 1, a structure that enables absorbing, e.g., tolerance and/or dimensional change due to aging can be provided.

Although in Embodiments 1 to 3, one of the distal end surface 34g1 of the plate-side lug 34g and the inner wall surface 32g of the wall 32e of the washer 32 is an inclined surface and the other is a surface erected relative to the planar portion 32d or both of the distal end surface 34g1 and the inner wall surface 32g (32g1) are inclined surfaces, it is possible that both the distal end surface 34g1 and the inner wall surface 32g are erected surfaces. In particular, where the dimensional relationship is "(b+c)>a>b" mentioned above, even if both the distal end surface 34g1 and the inner wall surface 32g are erected surfaces, a small gap is formed between the distal end surface 34g1 and the inner wall surface 32g, and thus, the plate 34 can easily be drawn into and received in the plate receiving space 32f.

Embodiments 4 to 6

Figure 12:
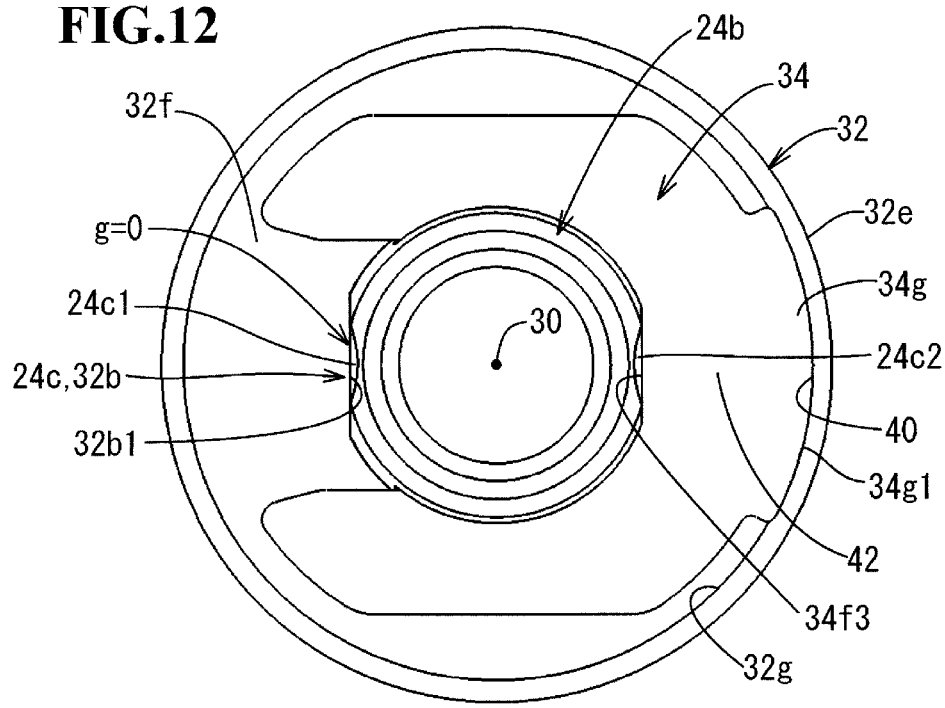
FIG. 12 is a diagram of Embodiment 4 of this invention illustrating a variation of plate-side lug disposition and is a plan view of a shaft axle with a washer and a plate assembled thereto as viewed in an axis direction of the shaft axle.
Figure 13:
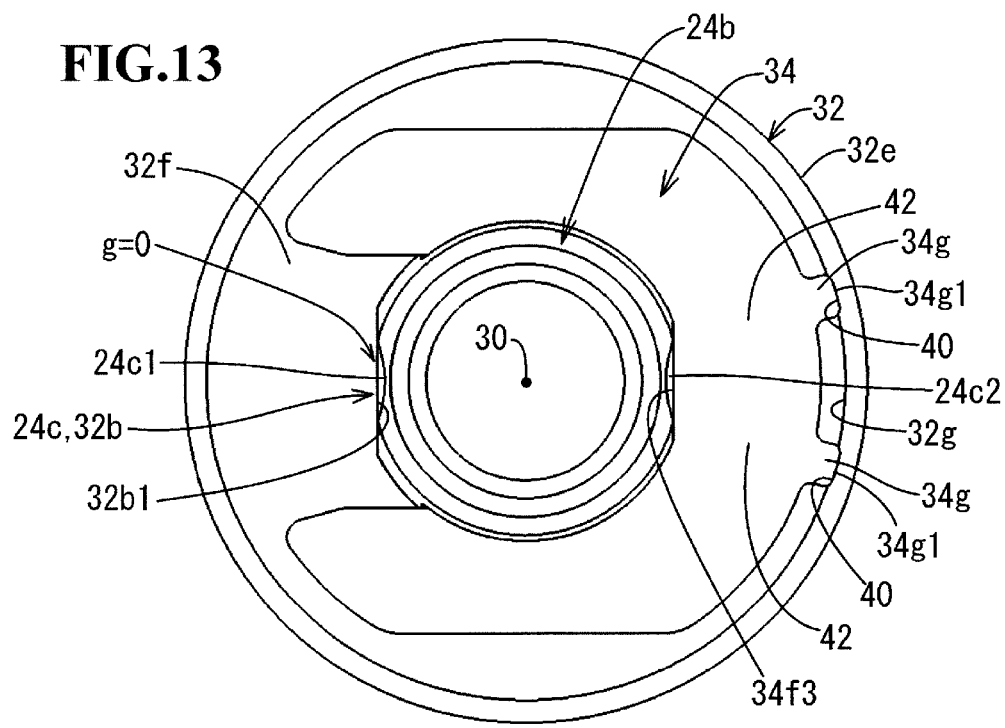
FIG. 13 is a diagram of Embodiment 5 of this invention illustrating a variation of plate-side lug disposition and is a plan view of a shaft axle with a washer and a plate assembled thereto as viewed in an axis direction of the shaft axle.
Figure 14:
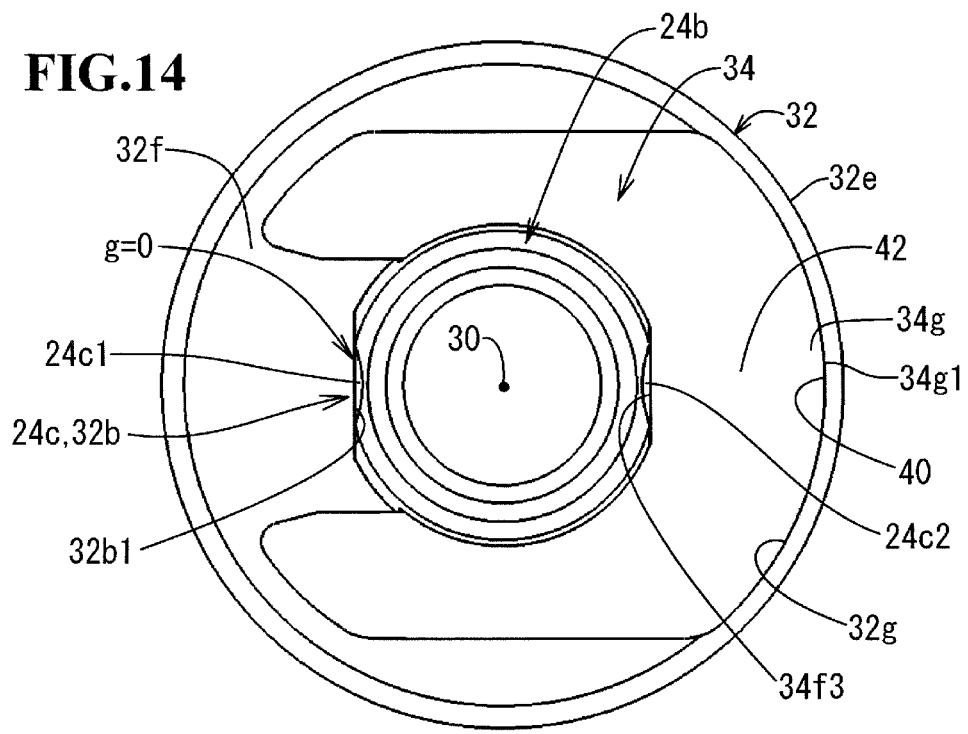
FIG. 14 is a diagram of Embodiment 6 of this invention illustrating a variation of plate-side lug disposition and is a plan view of a shaft axle with a washer and a plate assembled thereto as viewed in an axis direction of the shaft axle.

FIGS. 12 to 14 illustrate Embodiments 4 to 6 of this invention, respectively. Each of Embodiments 4 to 6 is one obtained by making change of a position in which a plate-side lug is disposed with respect to Embodiment 1. Each of FIGS. 12 to 14 is a plan view of a shaft axle with a washer and a plate assembled thereto as viewed in an axis direction of the shaft axle. For portions corresponding to respective portions of Embodiment 1, reference signs that are in common to these embodiments are used. Embodiments 4 to 6 will be described.

Embodiment 4: FIG. 12

In Embodiment 4 illustrated in FIG. 12, a plate-side lug 34g is formed wide in a direction around an axis 30. A distal end surface 34g1 of the plate-side lug 34g abuts on an inner wall surface 32g of a wall 32e of a washer 32 over an entire circumferential width thereof.

Embodiment 5: FIG. 13

In Embodiment 5 illustrated in FIG. 13, a plate-side lug 34g is formed at each of two positions in a direction around an axis 30. A distal end surface 34g1 of each plate-side lug 34g abuts on an inner wall surface 32g of a wall 32e of a washer 32.

Embodiment 6: FIG. 14

In Embodiment 6 illustrated in FIG. 14, a plate-side lug 34g extends over an entire width of a plate 34 in a direction around an axis 30. A distal end surface 34g1 of the plate-side lug 34g abuts on an inner wall surface 32g of a wall 32e of a washer 32 over an entire circumferential width thereof.

In Embodiments 4 to 6, a clamping portion 40 corresponds to a part of the inner wall surface 32g of the wall 32e of the washer 32, the part abutting against the plate-side lug 34g. A clamped portion 42 corresponds to a region of the plate 34, the region extending from the plate-side lug 34g to a linear portion 34f3 of an inner circumferential surface of the plate 34. In other words, a region of the plate 34, the region being located between the clamping portion 40 of the washer 32 and a width-across-flats surface 24c2 on the right side of a shaft axle 24b, corresponds to the clamped portion 42.

Embodiments 7 to 10

FIGS. 15 to 18 illustrate Embodiments 7 to 10 of this invention, respectively. Each of Embodiments 7 to 10 is one obtained by making change of the position of the lug from the plate 34 side to the washer 32 side with respect to Embodiments 1 and 4 to 6, respectively. Each of FIGS. 15 to 18 is a plan view of a shaft axle 24b with a washer 32 and a plate 34 assembled thereto as viewed in a direction along an axis 30 of the shaft axle 24b. For portions that correspond to the respective portions of Embodiment 1, reference signs that are in common to these embodiments are used. Embodiments 7 to 10 will be described.

Figure 15:
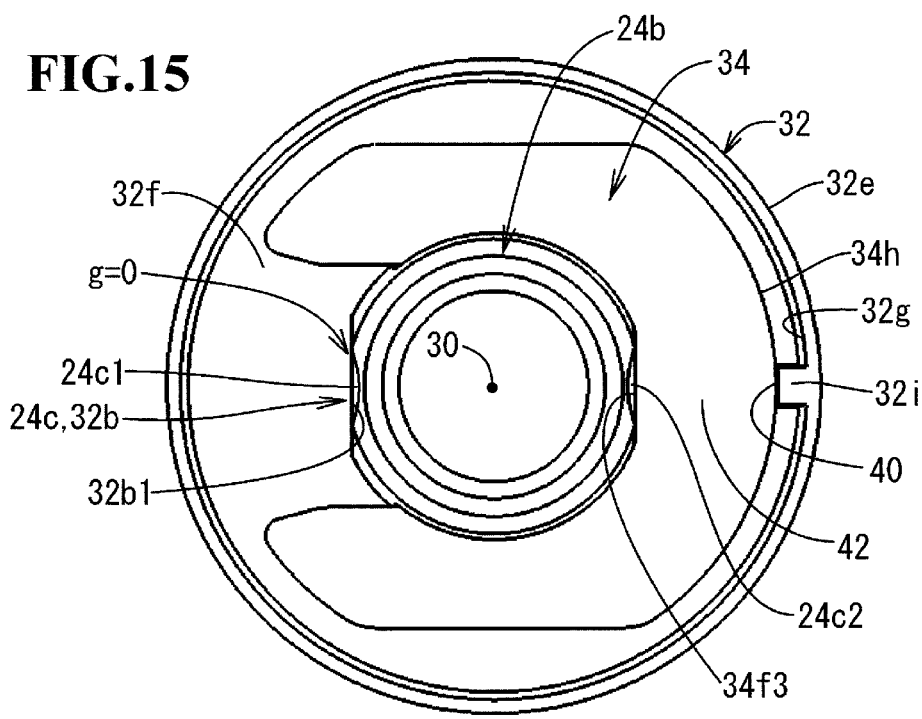
FIG. 15 is a diagram of Embodiment 7 of this invention illustrating an example of washer-side lug disposition and is a plan view of a shaft axle with a washer and a plate assembled thereto as viewed in an axis direction of the shaft axle.

Embodiment 7: FIG. 15

Embodiment 7 illustrated in FIG. 15 is one obtained by providing the plate-side lug 34g in Embodiment 1 (FIG. 1A) on the washer 32 side with the disposition position of the plate-side lug 34g left unchanged. In other words, at an inner wall surface 32g of a wall 32e of a washer 32, a washer-side lug 32i is formed in such a manner as to project inwardly in a radial direction of the washer 32. The washer 32 abuts on an outer circumferential surface 34h of a plate 34 at a distal end surface of the washer-side lug 32i. The washer-side lug 32i forms a part of the deviation mechanism.

Figure 16:
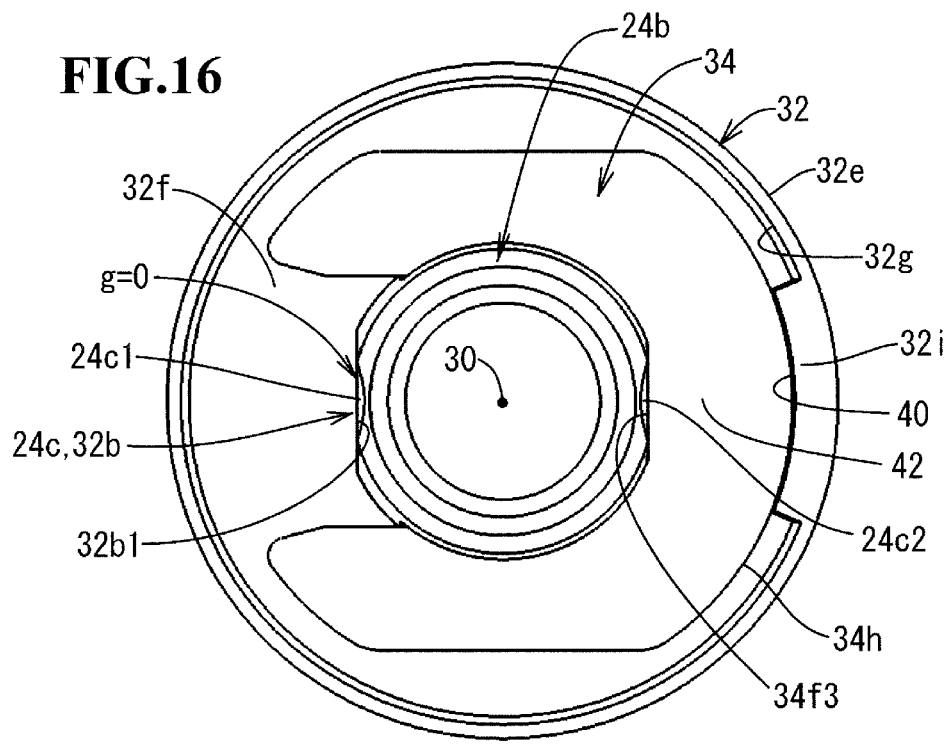
FIG. 16 is a diagram of Embodiment 8 of this invention illustrating a variation of washer-side lug disposition and is a plan view of a shaft axle with a washer and a plate assembled thereto as viewed in an axis direction of the shaft axle.

Embodiment 8: FIG. 16

Embodiment 8 illustrated in FIG. 16 is one obtained by providing the plate-side lug 34g in Embodiment 4 (FIG. 12) on the washer 32 side with the disposition position of the plate-side lug 34g left unchanged. In other words, at an inner wall surface 32g of a wall 32e of a washer 32, a washer-side lug 32i that is wide in a circumferential direction is formed in such a manner as to project inwardly in a radial direction of the washer 32. The washer 32 abuts on an outer circumferential surface 34h of a plate 34 over an entire length thereof in the circumferential direction of a distal end surface of the washer-side lug 32i.

Figure 17:
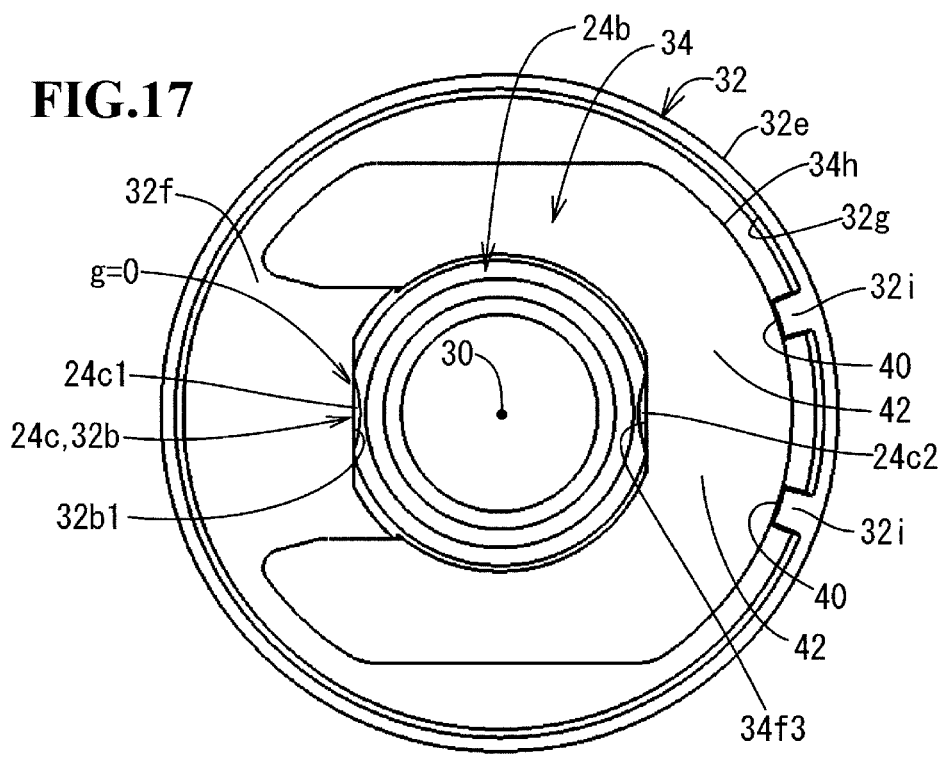
FIG. 17 is a diagram of Embodiment 9 of this invention illustrating a variation of washer-side lug disposition and is a plan view of a shaft axle with a washer and a plate assembled thereto as viewed in an axis direction of the shaft axle.

Embodiment 9: FIG. 17

Embodiment 9 illustrated in FIG. 17 is one obtained by providing the two plate-side lugs 34g in Embodiment 5

(FIG. 13) on the washer 32 side with the disposition positions of the plate-side lugs 34g left unchanged. In other words, at an inner wall surface 32g of a wall 32e of a washer 32, a washer-side lug 32i is formed in such a manner as to project inward in a radial direction of the washer 32 at each of two places in a direction around an axis 30. The washer 32 abuts on an outer circumferential surface 34h of a plate 34 at respective distal end surfaces of the two washer-side lugs 32i.

Figure 18:
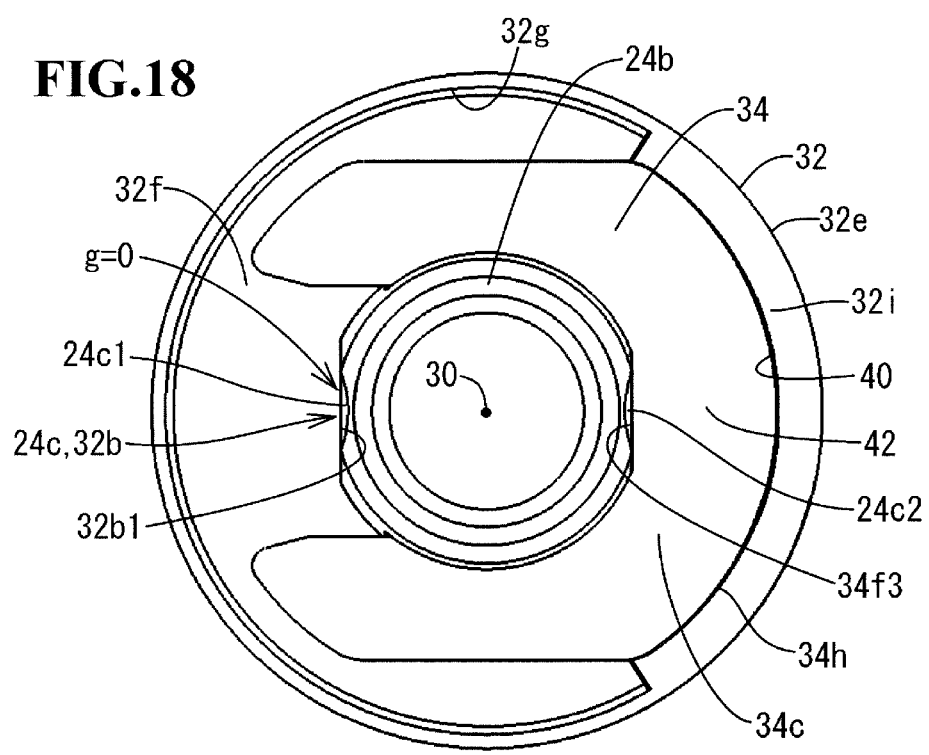
FIG. 18 is a diagram of Embodiment 10 of this invention illustrating a variation of washer-side lug disposition and is a plan view of a shaft axle with a washer and a plate assembled thereto as viewed in an axis direction of the shaft axle.

Embodiment 10: FIG. 18

Embodiment 10 illustrated in FIG. 18 is one obtained by providing the plate-side lug 34g that extends over an entire width of the plate 34 in Embodiment 6 (FIG. 14) on the washer 32 side with the disposition position thereof left unchanged. In other words, at an inner wall surface 32g of a wall 32e of a washer 32, a washer-side lug 32i is formed in such a manner as to project inward in a radial direction of the washer 32 over an entire width of a part of the inner wall surface 32g, the part facing an outer circumferential surface of an arc-like portion 34c of a plate 34. The washer 32 abuts on the outer circumferential surface 34h of the arc-like portion 34c of the plate 34 over an entire length in a circumferential direction of a distal end surface of the washer-side lug 32i.

In Embodiments 7 to 10, a clamping portion 40 corresponds to the distal end surface of the washer-side lug 32i of the washer 32. A clamped portion 42 corresponds to a region of the plate 34, the region extending from a surface abutting the washer-side lug 32i to a linear portion 34f3 of an inner circumferential surface of the plate 34. In other words, a region of the plate 34, the region being located between the clamping portion 40 of the washer 32 and a width-across-flats surface 24c2 on the right side of a shaft axle 24b, corresponds to the clamped portion 42.

In Embodiments 4 to 10, respective longitudinal sectional shapes of the distal end surface of the washer-side lug 32i and the outer circumferential surface of the plate 34, the outer circumferential surface abutting on the distal end surface, can be set as any of the following:
  One of the surfaces is an inclined surface and the other is a non-inclined surface (erected surface);
  Both of the surfaces are inclined surfaces; and
  Both of the surfaces are erected surfaces.

Embodiment 11

Figure 19A:
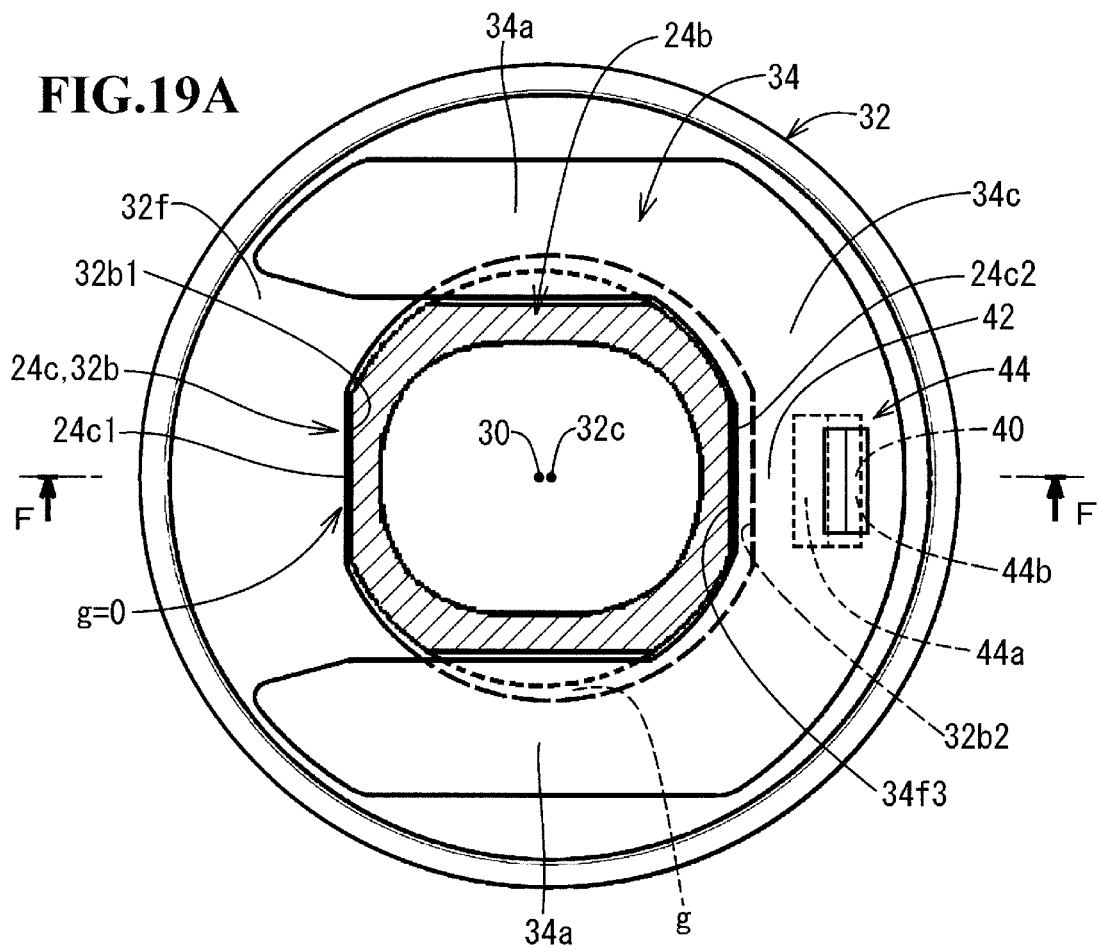
FIG. 19A is a diagram of Embodiment 11 of this invention illustrating a shaft axle with a washer and a plate assembled thereto and is a sectional view in a direction orthogonal to an axis of the shaft axle at a position, in a direction of the axis of the shaft axle, at which a washer and a plate are present.
Figure 19B:
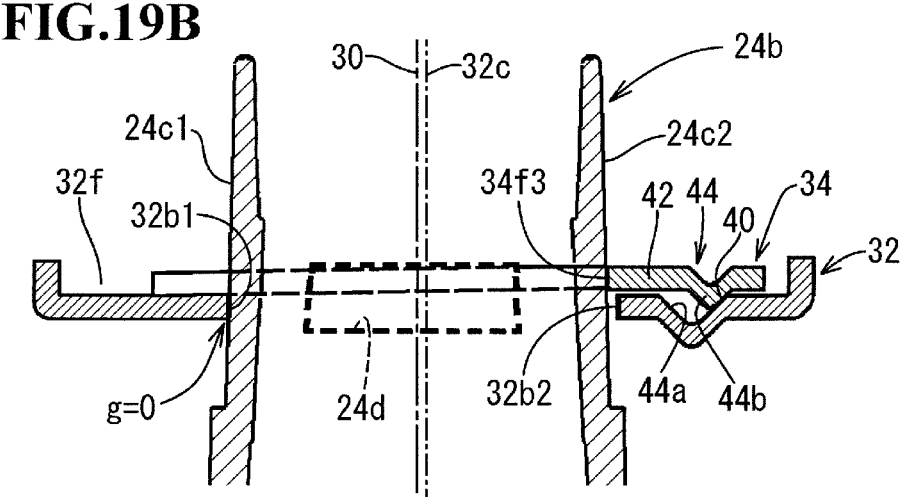
FIG. 19B is a sectional view along the line indicated by arrows F-F in FIG. 19A.

FIGS. 19A and 19B illustrate Embodiment 11 of this invention. In Embodiment 11, a projection/recess fitting structure 44 is formed in respective surfaces of a washer 32 and a plate 34, the surfaces facing each other. Embodiment 11 is the same as Embodiment 1 except that a projection/recess fitting structure 44 is provided and the plate-side lug 34g in FIGS. 1A and 1B is not provided. The projection/recess fitting structure 44 is here formed of a recess 44a formed in an upper surface of the washer 32 and a projection 44b formed in a lower surface of the plate 34. The recess 44a and the projection 44b are disposed in such a manner as to be slightly shifted from each other in a radial direction of the washer 32. Consequently, the recess 44a and the projection 44b are incompletely fitted together in the radial direction of the washer 32. The projection/recess fitting structure 44 is disposed at a position at which a helical compression spring 38 (not illustrated) does not interfere with the projection/recess fitting structure 44 at a lower surface of the washer 32. By the washer 32 being pushed against the plate 34 along an axis 30 by a biasing force of the helical compression spring 38, a force in a direction orthogonal to the axis 30 is generated between a wall surface on the outer circumferential side of the recess 44a and a wall surface on the outer circumferential side of the projection 44b. As a result, a linear portion 34f3 of an inner circumferential surface of the plate 34 pushes a width-across-flats surface 24c2 on the right side of a shaft axle 24b and a width-across-flats surface 32b1 on the left side of the washer 32 pushes a width-across-flats surface 24c1 on the left side of the shaft axle 24b, whereby a width-across-flats part 24c of the shaft axle 24b is clamped by the plate 34 and the washer 32 from the right and left sides. Consequently, a gap g between the width-across-flats surfaces 24c1, 32b1 on the left side becomes zero, whereby no rotation of the washer 32 relative to the shaft axle 24b along with rotation of the rotating section 28 occurs and no rattling sound at the beginning of rotation of the rotating section 28 occurs. A clamping portion 40 corresponds to the wall surface on the outer circumferential side of the recess 44a of the washer 32. A clamped portion 42 corresponds to a region of the plate 34, the region being located between the wall surface on the outer circumferential side of the projection 44b and the linear portion 34f3. Although in Embodiment 11, the recess 44a and the projection 44b forming the projection/recess fitting structure 44 are formed as a recess and a projection that face downward when viewed in FIG. 19B, instead of or in addition to these, a recess 44a and a projection 44b can be formed as a recess and a projection that face upward when viewed in FIG. 19B. Also, although in Embodiment 11, the projection/recess fitting structure is disposed at a position corresponding to an arc-like portion 34c of the plate 34 when viewed in FIG. 19A, instead of or in addition to this, a projection/recess fitting structure 44 can be disposed at each of positions corresponding to two parallel portions 34a, 34a of the plate 34 when viewed in FIG. 19A. In this case, the projection/recess fitting structure 44 in FIG. 19A is disposed in each of the parallel portions 34a, 34a with a pose thereof kept as it is (that is, with the pose of the projection/recess fitting structure 44 in FIG. 19A translated without being rotated around the center axis 30 of the shaft).

Embodiment 12

Figure 20A:
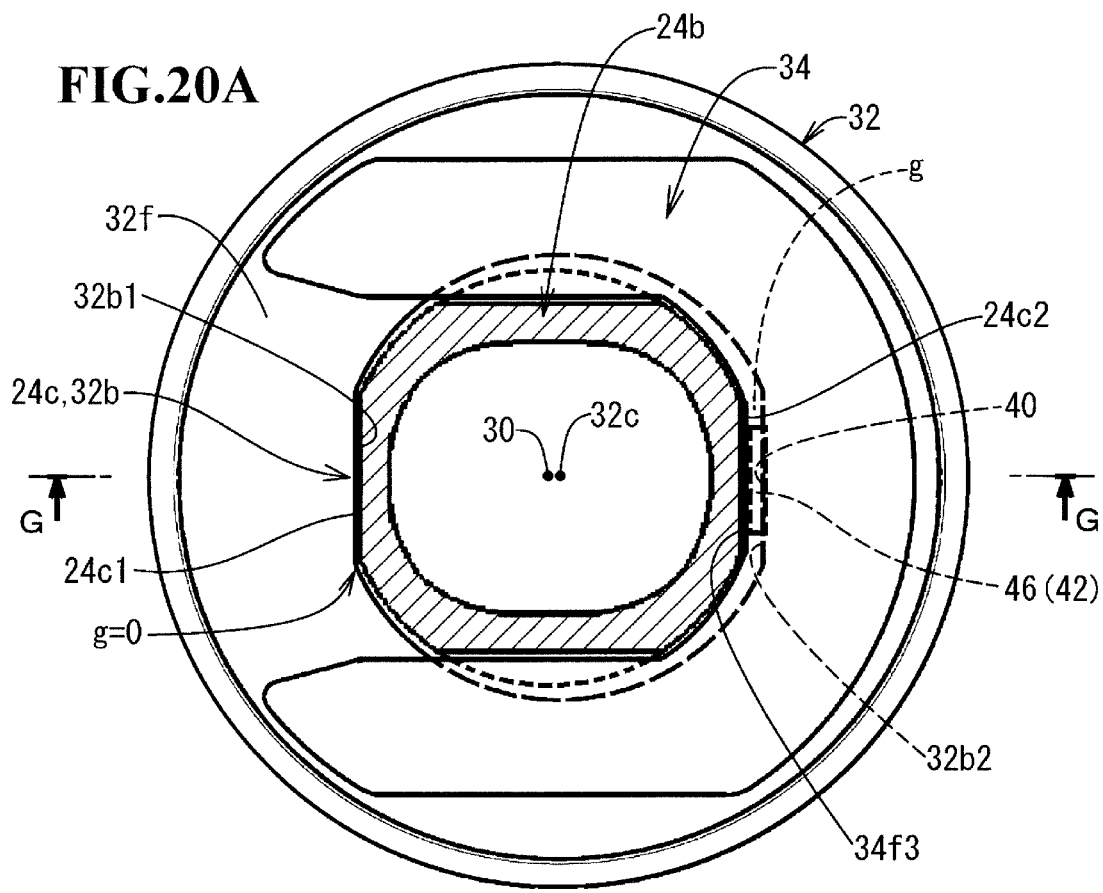
FIG. 20A is a diagram of Embodiment 12 of this invention illustrating a shaft axle with a washer and a plate assembled thereto and is a sectional view in a direction orthogonal to an axis of the shaft axle at a position, in a direction of the axis of the shaft axle, at which a washer and a plate are present.
Figure 20B:
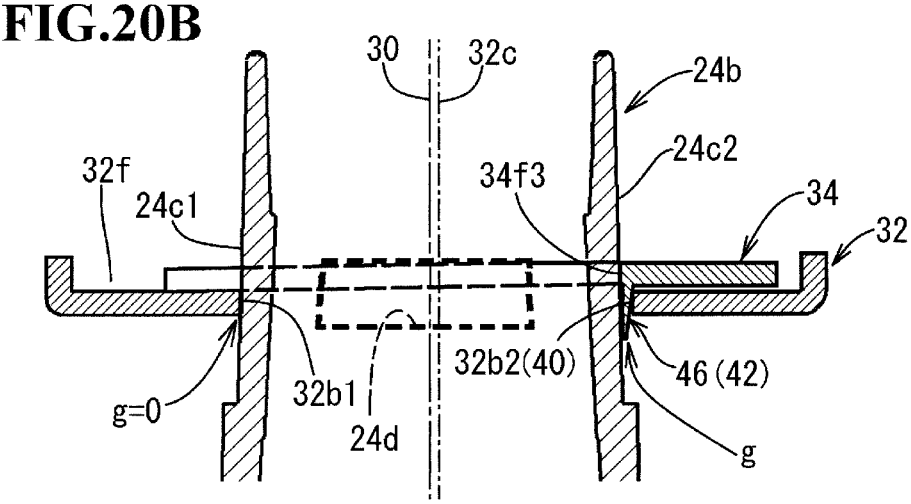
FIG. 20B is a sectional view along the line indicated by arrows G-G in FIG. 20A.

FIGS. 20A and 20B illustrate Embodiment 12 of this invention. In Embodiment 12, an insert 46 is formed integrally with a plate 34 in such a manner as to project downward from a position in an inner circumference of the plate 34. The insert 46 is formed in a wedge shape having a thickness decreasing toward a bottom thereof. Embodiment 12 is the same as Embodiment 1 except that the insert 46 is provided and the plate-side lug 34g in FIGS. 1A and 1B is not provided. The insert 46 is inserted to a gap g between width-across-flats surfaces 24c2, 32b2 on the right side. By the washer 32 being pushed against the plate 34 along an axis 30 by a biasing force of the helical compression spring 38 (not illustrated), a force in a direction that is orthogonal to the axis 30 is generated between a surface on the outer circumferential side of the insert 46 and a width-across-flats surface 32b2 on the right side of the washer 32. As a result, a width-across-flats surface 32b1 on the left side of the washer 32 pushes a width-across-flats surface 24c1 on the left side of a shaft axle 24b, whereby a width-across-flats part 24c of the shaft axle 24b is clamped by the plate 34 and the washer 32 from the right and left sides. Consequently, a gap g between the width-across-flats surfaces 24c1, 32b1 on the left side becomes zero, whereby no rotation of the washer 32 relative to the shaft axle 24b along with rotation of a rotating section 28 occurs and no rattling sound at the beginning of rotation of the rotating section 28 occurs. A clamping portion 40 corresponds to the width-across-flats surface 32b2 on the right side of the washer 32. A clamped portion 42 corresponds to the insert 46.

Embodiment 13

Figure 21A:
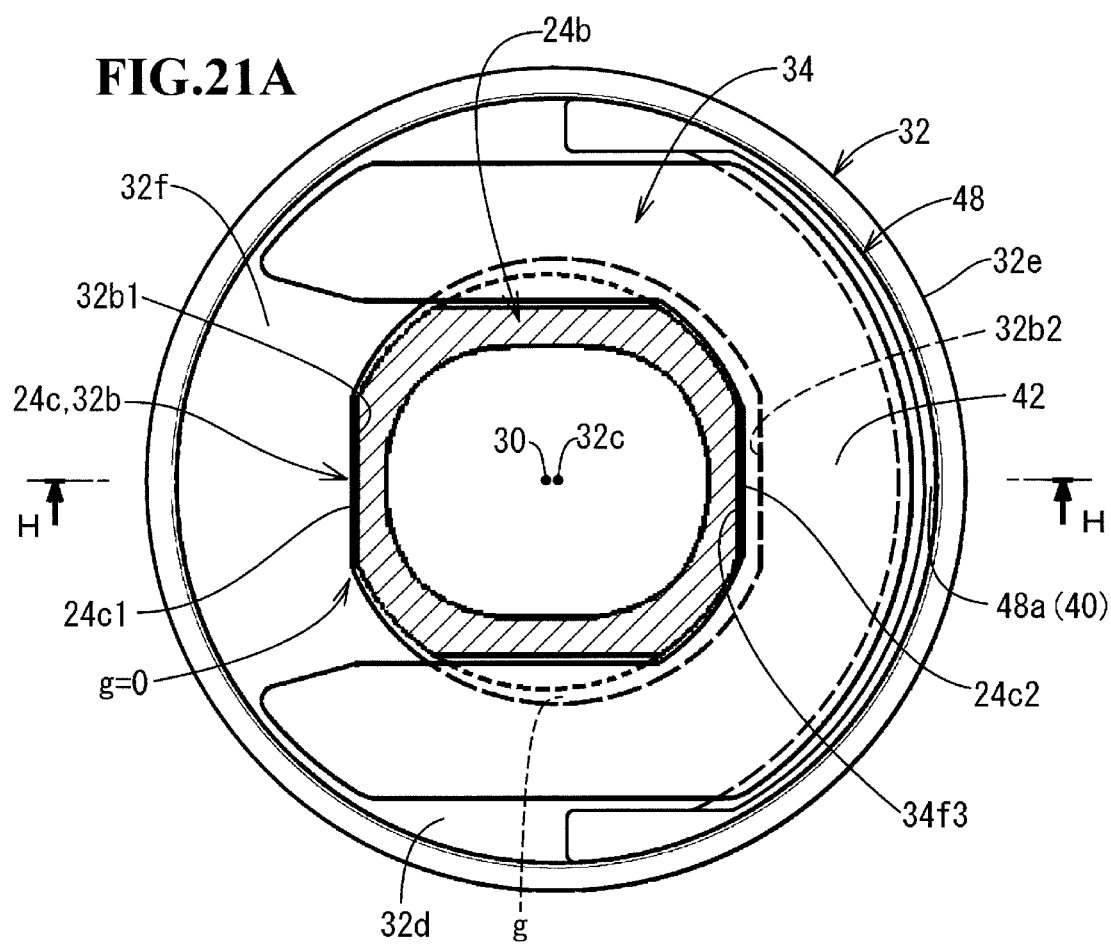
FIG. 21A is a diagram of Embodiment 13 of this invention illustrating a shaft axle with a washer and a plate assembled thereto and is a sectional view in a direction orthogonal to an axis of the shaft axle at a position, in a direction of the axis of the shaft axle, at which a washer and a plate are present.
Figure 21B:
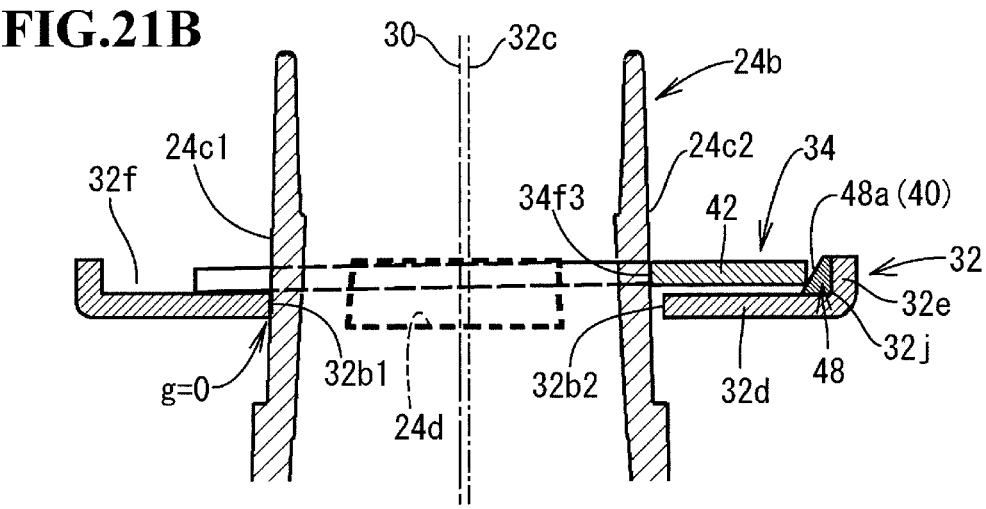
FIG. 21B is a sectional view along the line indicated by arrows H-H in FIG. 21A.

FIGS. 21A and 21B illustrate Embodiment 13 of this invention. In Embodiment 13, a washer 32 includes an auxiliary tool 48 as a part of the washer 32 and a clamping portion 40 is formed by an inclined surface 48a of the auxiliary tool 48. Here, a washer 32 having a structure in which a wall 32e rises upwardly and perpendicularly from an entire outer circumference of a planar portion 32d, which has been described in Embodiment 2 (FIG. 10), is used. Embodiment 13 is the same as Embodiment 1 except that the plate 34 includes no plate-side lug, the washer 32 includes the auxiliary tool 48 and the wall 32e of the washer 32 rises perpendicularly from the planar portion 32d. The auxiliary tool 48 is formed of, e.g., a die casting of, e.g., zinc or aluminum or a hard resin (e.g., reinforced resin). As illustrated in FIG. 21A, a plan shape of the auxiliary tool 48 is a bow-like shape. The auxiliary tool 48 is received in a plate receiving space 32f, and as illustrated in FIG. 21B, is disposed at a corner 32j between the planar portion 32d and the wall 32e of the washer 32. The auxiliary tool 48 includes an inclined surface 48a in a front surface. By the washer 32 being pushed against the plate 34 along an axis 30 by a biasing force of a helical compression spring 38 (not illustrated), an outer circumferential surface of the plate 34 and the inclined surface 48a of the auxiliary tool 48 are pushed against and abut on each other. As a result, a linear portion 34f3 of an inner circumferential surface of the plate 34 pushes a width-across-flats surface 24c2 on the right side of a shaft axle 24b and a width-across-flats surface 32b1 on the left side of the washer 32 pushes a width-across-flats surface 24c1 on the left side of the shaft axle 24b, whereby a width-across-flats part 24c of the shaft axle 24b is clamped by the plate 34 and the washer 32 from the right and left sides. Consequently, a gap g between the width-across-flats surfaces 24c1, 32b1 on the left side becomes zero, whereby no rotation of the washer 32 relative to the shaft axle 24b along with rotation of the rotating section 28 occurs and no rattling sound at the beginning of rotation of the rotating section 28 occurs. A clamping portion 40 corresponds to the inclined surface 48a of the auxiliary tool 48 of the washer 32. A clamped portion 42 corresponds to a region of the plate 34, the region being located between a surface abutting the auxiliary tool 48 and the linear portion 34f3.

Embodiment 14

Figure 22A:
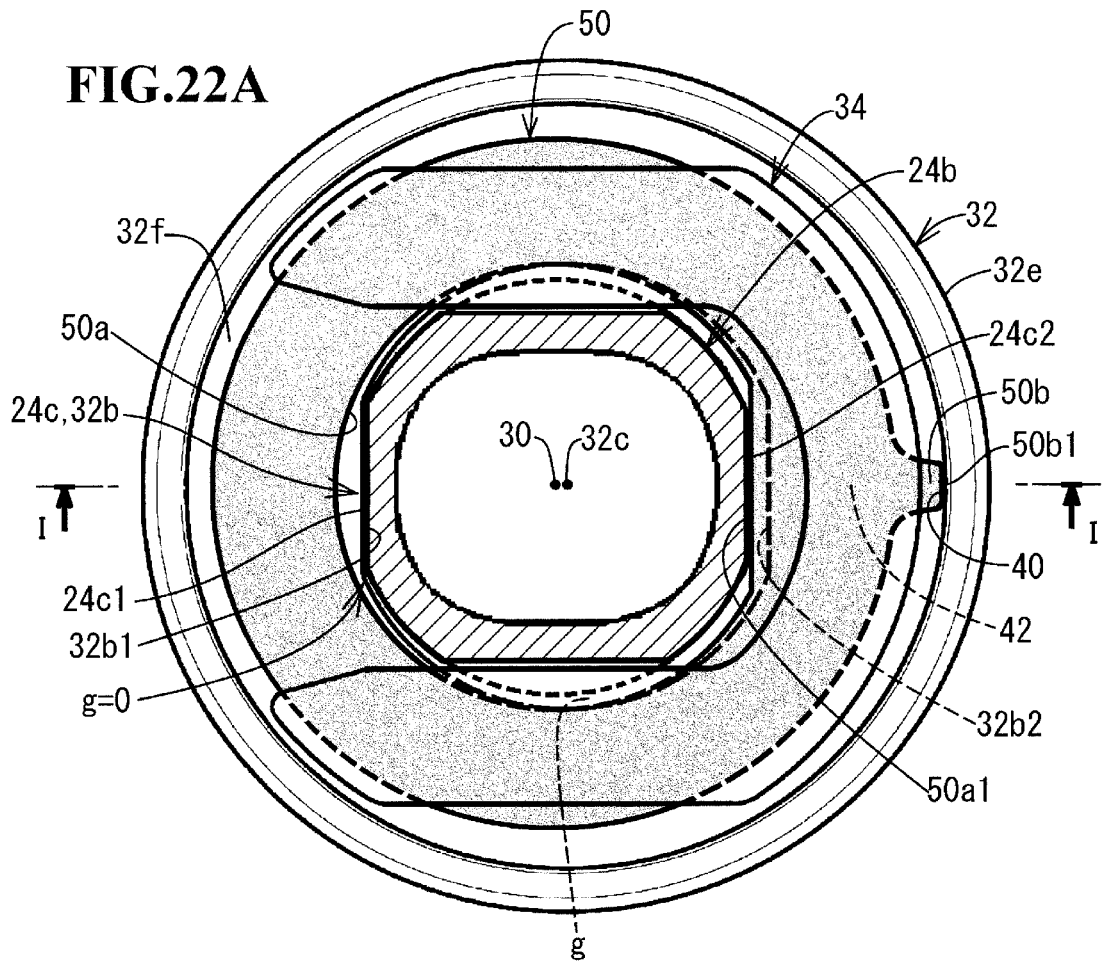
FIG. 22A is a diagram of Embodiment 14 of this invention illustrating a shaft axle with a washer and a plate assembled thereto and is a sectional view in a direction orthogonal to an axis of the shaft axle at a position, in a direction of the axis of the shaft axle, at which a washer and a plate are present.
Figure 22B:
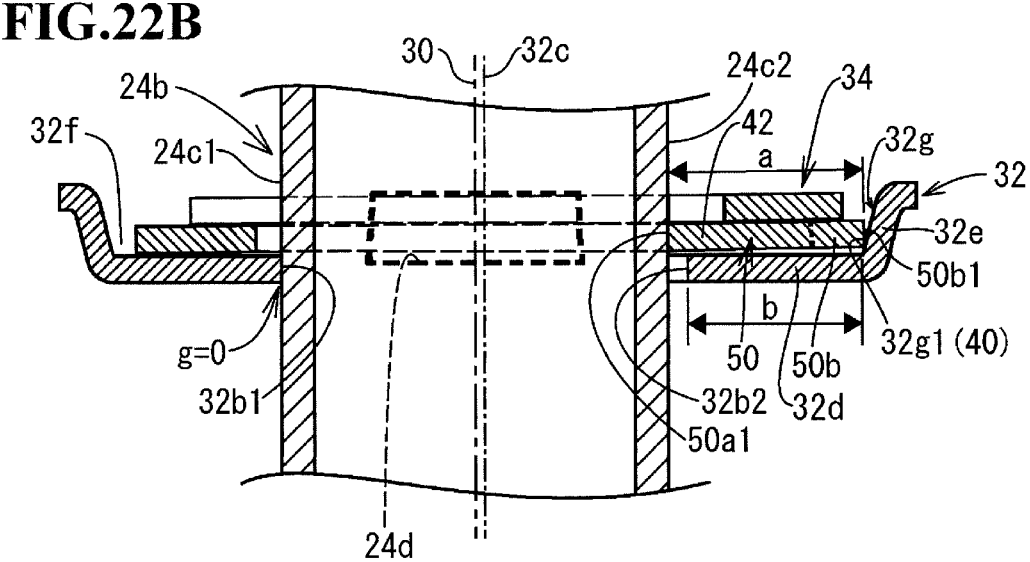
FIG. 22B is a sectional view along the line indicated by arrows I-I in FIG. 22A.

FIGS. 22A and 22B illustrate Embodiment 14 of this invention. In Embodiment 14, an additional plate 50 is inserted between opposed surfaces of a washer 32 and a plate 34 and a clamped portion 42 is formed at the additional plate 50. Embodiment 14 is the same as Embodiment 1 except that the additional plate 50 is provided, a plate 34 includes no plate-side lug and a height of the wall 32e of the washer 32 (height of the plate receiving space 32f) is increased according to the additional plate 50 being stacked. The additional plate 50 is formed in a flat plate shape having a thickness that is uniform in its entirety by shaping a metal such as a metal alloy that is the same as those of the washer 32 and the plate 34 via stamping. As illustrated in FIG. 22A, a plan shape of the additional plate 50 is a substantially ring-like shape. In other words, an outer shape of the additional plate 50 is a shape of a circle of a size that allows the additional plate 50 to be received in the plate receiving space 32f. At a center portion of the additional plate 50, a center hole 50a to which a shaft axle 24b is inserted is formed. At an outer circumferential surface of the additional plate 50, an additional plate-side lug 50b is formed in such a manner as to project outward in a radial direction of the additional plate 50. The additional plate-side lug 50b forms a part of a deviation mechanism. In Embodiment 14, as illustrated in FIG. 22B, a distal end surface 50b1 of the additional plate-side lug 50b is formed as a surface perpendicular to a plane of the plate 34. A linear portion 50a1 is formed at a position in an inner circumferential surface of the center hole 50a of the additional plate 50, the position being on the opposite side of a plane of the additional plate 50 in the radial direction from the additional plate-side lug 50b. As illustrated in the sectional view in FIG. 22B, width "a" between the distal end surface 50b1 and the linear portion 50a1 of the additional plate-side lug 50b is set as "a>b" relative to width "b" of a planar portion 32d of the washer 32 at the position of the section. An inclined surface 32g1 is formed at an inner wall surface 32g of the wall 32e of the washer 32. The additional plate-side lug 50b is clamped in a thickness direction between the plate 34 and the washer 32 by a biasing force of a helical compression spring 38 (not illustrated). The additional plate 50 is clamped in a radial direction between the inner wall surface 32g of the wall 32e of the washer 32 and a width-across-flats surface 24c2 on the right side of a shaft axle 24b, at a circumferential position at which the additional plate-side lug 50b is present. The distal end surface 50b1 of the additional plate-side lug 50b is pushed against and abuts on the inclined surface 32g1 of the washer 32. As a result, the linear portion 50a1 of the inner circumferential surface of the additional plate 50 pushes the width-across-flats surface 24c2 on the right side of the shaft axle 24b, and a width-across-flats surface 32b1 on the left side of the washer 32 pushes a width-across-flats surface 24c1 on the left side of the shaft axle 24b, whereby a width-across-flats part 24c of the shaft axle 24b is clamped by the additional plate 50 and the washer 32 from the right and left sides. Consequently, a gap g between the width-across-flats surfaces 24c1, 32b1 on the left side becomes zero, whereby no rotation of the washer 32 relative to the shaft axle 24b along with rotation of a rotating section 28 occurs and no rattling sound at the beginning of rotation of the rotating section 28 occurs. A clamping portion 40 corresponds to a part of the inclined surface 32g1 at the inner wall surface 32g of the wall 32e of the washer 32, the part abutting against the distal end surface 50b1 of the additional plate-side lug 50b. A clamped portion 42 corresponds to a region between the distal end surface 50b1 of the additional plate-side lug 50b and the linear portion 50a1. Note that an operation and effects that are the same as above can be provided even if the additional plate 50 is assembled to the shaft axle 24b with the additional plate 50 flipped in a right-left direction (that is, in FIGS. 22A and 22B, the assembling may be performed in such a manner that the additional plate-side lug 50b is disposed on the left side of the shaft axle 24b).

Embodiment 15

Figure 23:
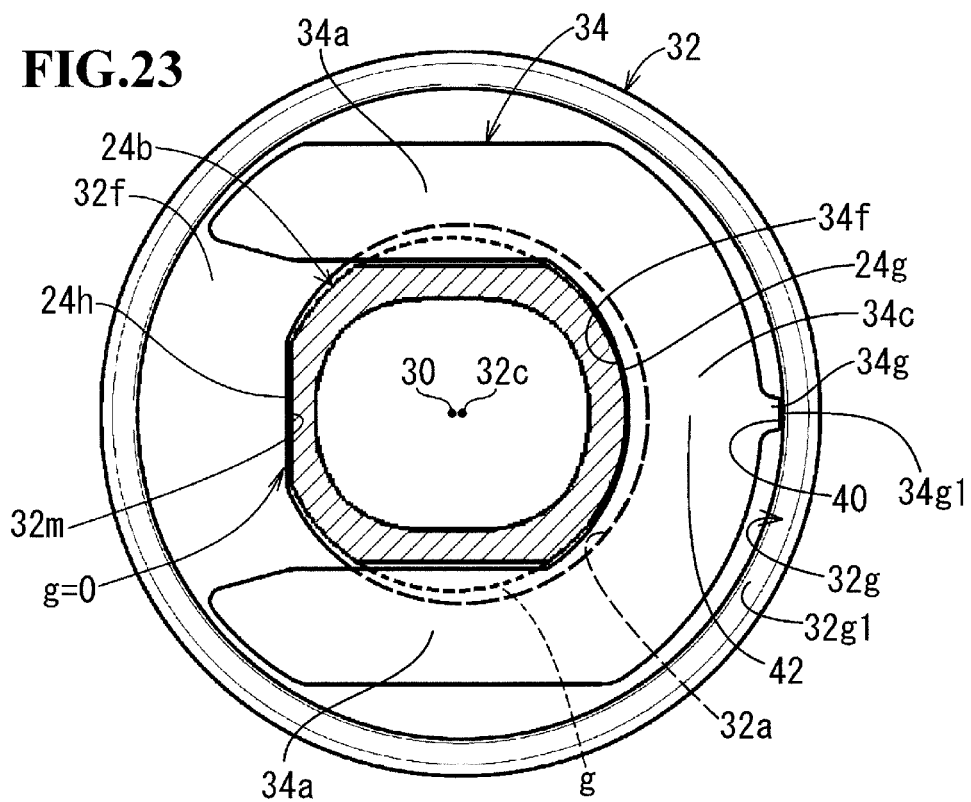
FIG. 23 is a diagram illustrating Embodiment 15 of this invention and is a sectional view at a position that is the same as that in FIG. 1 relating to Embodiment 1.

FIG. 23 illustrates Embodiment 15 of this invention. Embodiment 15 is one obtained by D-shaped portions 24h, 32m being disposed instead of the width-across-flats parts 24c, 32b (FIG. 1) of the shaft axle 24b and the washer 32 in Embodiment 1. For portions corresponding to respective portions of Embodiment 1, reference signs that are in common to these embodiments are used. In FIG. 23, at an outer circumferential surface of a shaft axle 24b, a plane forming the D-shaped portion 24h (different diameter portion of the shaft axle 24a) is formed in such a manner as to extend along an axis 30 of a shaft 24. To be exact, the plane is slightly inclined relative to the axis 30 because of a draft of the shaft axle 24b. On the other hand, at an inner circumferential surface of a center hole 32a of a washer 32, the D-shaped portion 32m (different diameter portion of a center hole 32a of a washer 32) is formed. An inner circumferential surface 34f of an arc-like portion 34c of a plate 34 is formed in a circular arc-like shape over an entire length in a circumferential direction thereof. In other words, the inner circumferential surface 34f of the arc-like portion 34c of the plate 34 does not have the linear portion 34β in FIG. 1. FIG. 23 illustrates an actual use state in which a distal end surface 34g1 of a plate-side lug 34g is kept in a state of being pushed against and abutting at an intermediate position in a height direction of an inclined surface 32g1 or a lower end of a wall 32e of the washer 32 and being thereby locked by a biasing force of a helical compression spring 38 (FIG. 1). At this time, the D-shaped portions 24h, 32m are closely pushed against and abut on each other over an entire length in a circumferential direction on the left side of the shaft axle 24b. As illustrated in FIG. 23, a plan shape of respective surfaces of the D-shaped portion 24h, 32m, the surfaces abutting on each other, is a linear line. Also, a circular portion 24g of the outer circumferential surface of the shaft axle 24b and the circular arc-like inner circumferential surface 34f of the arc-like portion 34c of the plate 34 are pushed against and abut on each other on the right side of the shaft axle 24b. In other words, the shaft axle 24b is clamped by the D-shaped portion 32m of the washer 32 on the left side of the shaft axle 24b and the circular-arc inner circumferential surface 34f of the plate 34 on the right side of the shaft axle 24b from the left and right sides by the biasing force of the helical compression spring 38. Consequently, a gap g between the D-shaped portions 24h, 32m can be maintained as zero. Therefore, no rotation of the washer 32 relative to the shaft axle 24b along with rotation of the rotating section 28 occurs and no rattling sound at the beginning of rotation of the rotating section 28 occurs. A clamping portion 40 corresponds to a part of an inner wall surface 32g of the wall 32e of the washer 32, the part abutting against the plate-side lug 34g. A clamped portion 42 corresponds to a region of the plate 34, the region extending from the plate-side lug 34g to a place at which the circular arc-like inner circumferential surface 34f of the arc-like portion 34c and the circular portion 24g of the outer circumferential surface of the shaft axle 24b abut on each other. Note that in the configuration including the D-shaped portions 24h, 32m in FIG. 23, a width, in the right-left direction in the sheet of FIG. 23, of the center hole 32a of the washer 32 is large in comparison with the configuration including the width-across-flats parts 24c, 32b in FIG. 1. Therefore, with the configuration in FIG. 23, in a state in which the washer 32 is not biased by the helical compression spring 38, the washer 32 is likely to rotate free relative to the shaft axle 24b. However, even in such case, in the state illustrated in FIG. 23 in which the washer 32 is biased by the helical compression spring 38, the D-shaped portions 24h, 32m are pushed against and abut on each other, and thus, the washer 32 does not rotate free relative to the shaft axle 24b, and no rotation of the washer 32 relative to the shaft axle 24b along with rotation of a rotating section 28 occurs and no rattling sound at the beginning of rotation of the rotating section 28 occurs. Therefore, this invention can be carried out in a configuration in which a washer 32 rotates free relative to a shaft axle 24b when the washer 32 is not biased by a helical compression spring 38. In other words, this invention can be carried out in a configuration not including a rotation preventing mechanism such as width-across-flats parts that prevent a washer 32 from rotating free around an axis 30 even in a state in which the washer 32 is not biased by a helical compression spring 38.

Embodiment 16

Figure 24:
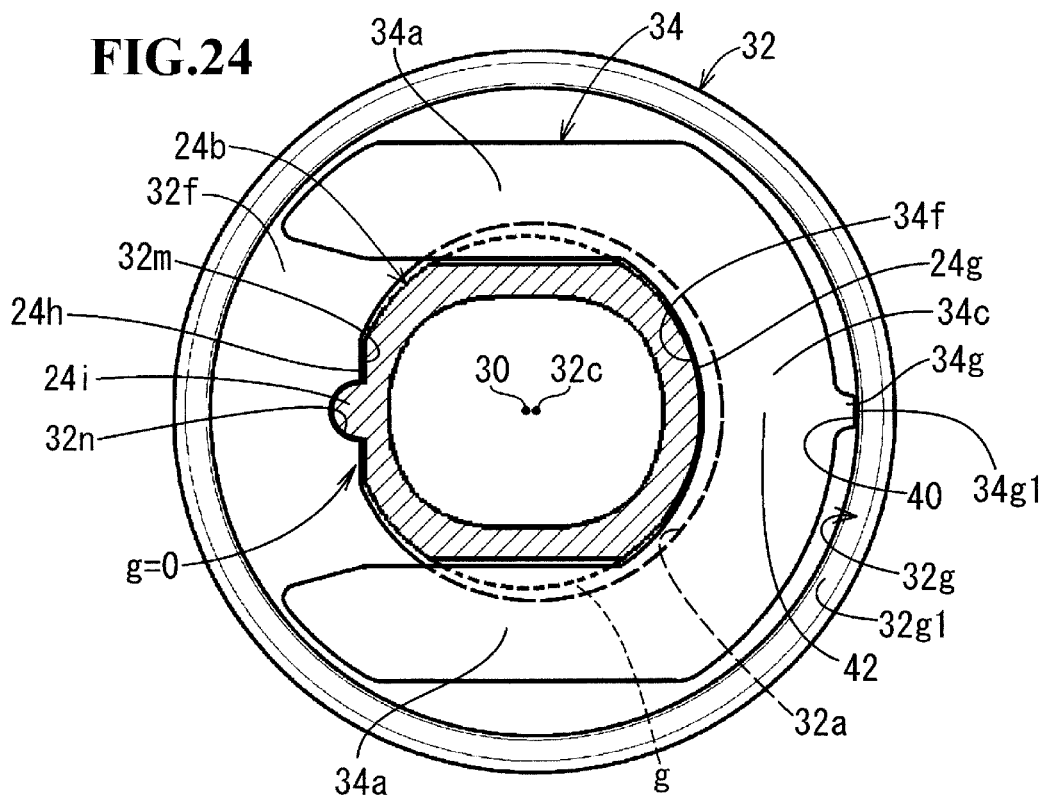
FIG. 24 is a diagram illustrating Embodiment 16 of this invention and is a sectional view at a position that is the same as that in FIG. 23 relating to Embodiment 15.

FIG. 24 illustrates Embodiment 16 of this invention. Embodiment 16 is one obtained by providing a fitting portion including a projection and a recess at the surfaces of the D-shaped portions 24h, 32m, the surfaces abutting on each other, in Embodiment 15. In FIG. 24, for portions corresponding to the respective portions of Embodiment 15 in FIG. 23, reference signs that are in common to these embodiments are used. In FIG. 24, at a center portion in a width direction (up-down direction in the sheet of FIG. 24) of a D-shaped portion 24h of a shaft axle 24b, a projection 24i is formed in such a manner as to extend along an axis 30 of a shaft 24. To be exact, the projection 24i is slightly inclined relative to the axis 30 because of a draft of the shaft axle 24b. On the other hand, at a center portion in a width direction (up-down direction in the sheet of FIG. 24) of a D-shaped portion 32m of a washer 32, a recess 32n is formed. The projection 24i and the recess 32n are loosely fitted to each other in a direction around the axis 30, whereby the washer 32 can freely move relative to the shaft axle 24b along the axis 30. With the configuration in FIG. 24, even in a state in which the washer 32 is not biased by a helical compression spring 38, the projection 24i and the recess 32n are loosely fitted to each other in the direction around the axis 30, and thus, the washer 32 does not rotate free relative to the shaft axle 24b. Upon the washer 32 being biased by the helical compression spring 38, the D-shaped portions 24h, 32m are pushed against and abut on each other with the projection 24i and the recess 32n fitted to each other. Therefore, no rotation of the washer 32 relative to the shaft axle 24b along with rotation of a rotating section 28 occurs and no rattling sound at the beginning of rotation of the rotating section 28 occurs.

Embodiment 17

Figure 25:
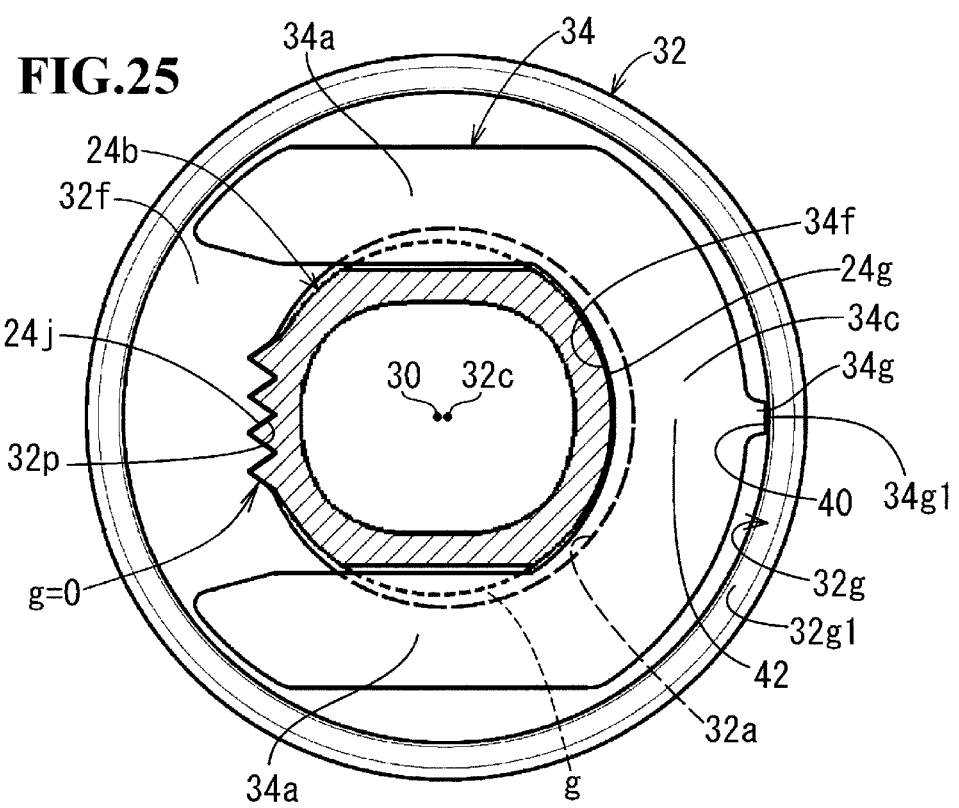
FIG. 25 is a diagram illustrating Embodiment 17 of this invention and is a sectional view at a position that is the same as that in FIG. 23 relating to Embodiment 15.

FIG. 25 illustrates Embodiment 17 of this invention. Embodiment 17 is one obtained by providing a fitting portion including serrated or waved projections/recesses instead of the D-shaped portions 24h, 32m in Embodiment 15. In FIG. 25, for portions corresponding to the respective portions of Embodiment 15 in FIG. 23, reference signs that are in common to these embodiments are used. In FIG. 25, in an outer circumferential surface on the left side of a shaft axle 24b, a serrated or waved surface 24j (different diameter portion of the shaft axle 24a) is formed. As illustrated in FIG. 25, the surface 24j, a section orthogonal to an axis 30 of the surface 24j having a serrated or waved shape, is formed in such a manner as to extend along the axis 30. To be exact, the surface 24j is slightly inclined relative to the axis 30 because of a draft of the shaft axle 24b. On the other hand, at an inner circumferential surface on the left side of a center hole 32a of a washer 32, a serrated or waved surface 32p (different diameter portion of the center hole 32a of the washer 32) is formed. The serrated or waved surfaces 24j, 32p are loosely fitted to each other in a direction around the axis 30, whereby the washer 32 can freely move along the axis 30 relative to the shaft axle 24b. With the configuration in FIG. 25, even in a state in which the washer 32 is not biased by a helical compression spring 38, the serrated or waved surfaces 24j, 32p are loosely fitted to each other in the direction around the axis 30, and thus, the washer 32 does not rotate free relative to the shaft axle 24b. Upon the washer 32 being biased by the helical compression spring 38, the serrated or waved surfaces 24j, 32p are pushed against and abut on each other in the mutually fitted state. Therefore, no rotation of the washer 32 relative to the shaft axle 24b along with rotation of a rotating section 28 occurs and no rattling sound at the beginning of rotation of the rotating section 28 occurs.

In each of the above embodiments, one or both of the washer 32 and the plate 34 can be assembled to the shaft axle 24b with the washer 32 and/or the plate 34 flipped in the right-left direction. For example, in FIGS. 1A and 1B, the assembling can be performed in such a manner that the plate-side lug 34g is disposed on the left side of the shaft axle 24b. Also, although the above embodiments have been described in terms of a case where only one of the plate-side lug 34g (or the additional plate-side lug 50b) and the washer-side lug 32i is provided as a lug included in the deviation mechanism, both the plate-side lug 34g (or the additional plate-side lug 50b) and the washer-side lug 32i can be provided.

Note that as described above, this invention is applicable to both a configuration including a rotation preventing mechanism that prevents a washer from rotating free around a shaft in a state in which the washer is not biased by a helical compression spring and a configuration including no such rotation preventing mechanism.

The above embodiments have been described in terms of a case where this invention is applied to a view device for a vehicle, the view device including a mirror plate as a view section body, this invention is applicable also to view devices for a vehicle, the view devices each including a cameras or other view section body.

What is claimed is:

1. A tilting mechanism of a view device for a vehicle, the tilting mechanism comprising:
    a fixed portion to be fixed to a vehicle body, the fixed portion including a shaft;
    a rotating section capable of mounting a view section body therein, the rotating section being supported by the fixed portion in such a manner as to be rotatable around a center axis of the shaft;
    a helical compression spring that is fitted onto the shaft of the fixed portion by which the rotating section is supported and that provides a pushing force between the rotating section and the fixed portion;
    a washer including a center hole, the washer being fitted onto the shaft in such a manner that the shaft is inserted in the center hole on a free-end side of the shaft with the helical compression spring fitted thereon;
    a plate attached to the free-end side of the shaft with the helical compression spring and the washer fitted thereon, the plate preventing the washer from being moved to the free-end side of the shaft by a biasing force of the helical compression spring; and
    a deviation mechanism, wherein
    a gap in a radial direction of the shaft and the washer is formed between an outer circumferential surface of the shaft and an inner circumferential surface of the center hole of the washer;
    the outer circumferential surface of the shaft includes a different diameter portion that is different in diameter from another part in a direction around the center axis of the shaft, the different diameter portion being formed at one or more places in the direction around the center axis of the shaft;
    the inner circumferential surface of the center hole of the washer includes a different diameter portion that is different in diameter from another part in a direction around a center axis of the center hole, the different diameter portion being formed at one or more places in the direction around the center axis of the center hole; and
    the deviation mechanism acts between the shaft and the washer to move the washer relative to the shaft in the radial direction to deviate a position of the center hole of the washer relative to a position of the shaft in such a manner that the gap becomes narrow or zero between the respective different diameter portions at at least one place, the different diameter portions facing each other, whereby when a rotational force for rotation around the center axis of the shaft is applied to the washer, the deviation mechanism curbs rotation of the washer via engagement between the different diameter portions.

2. The tilting mechanism of a view device for a vehicle according to claim 1, wherein:
    the deviation mechanism includes a clamped portion formed in the plate and a clamping portion formed in the washer, the clamped portion and the clamping portion being disposed at respective positions on an opposite side of the shaft from the different diameter portions at the place at which the gap between the different diameter portions becomes narrow or zero; and
    the clamped portion is clamped between the shaft and the clamping portion and deviates the position of the center hole of the washer from the position of the shaft by restricting a distance between the shaft and the clamping portion due to the gap being reduced to be smaller than a predetermined state.

3. The tilting mechanism of a view device for a vehicle according to claim 2, wherein:
    the washer includes a wall that rises upward from an entire outer circumference of the washer and a space on an inner circumferential side of the wall forms a plate receiving space that receives the plate;
    the deviation mechanism includes respective abutment parts via which an outer circumferential surface of the plate received in the plate receiving space and an inner wall surface of the wall abut on each other;
    the abutment part of the wall forms the clamping portion; and
    a part of the plate, the part being located between the abutment part of the plate and the shaft, forms the clamped portion.

4. The tilting mechanism of a view device for a vehicle according to claim 3, wherein:
    the clamped portion includes a plate-side lug formed at the outer circumferential surface of the plate in such a manner as to project outward in a radial direction of the plate; and
    the plate abuts on the abutment part of the wall at the plate-side lug.

5. The tilting mechanism of a view device for a vehicle according to claim 3, wherein:
the clamping portion includes a washer-side lug formed at the inner wall surface of the wall of the washer in such a manner as to project inwardly in the radial direction of the washer; and
the washer abuts on the outer circumferential surface of the plate at the washer-side lug.

6. The tilting mechanism of a view device for a vehicle according to claim 2, wherein:
the deviation mechanism includes an inclined surface formed at least one of respective surfaces of the clamping portion and the clamped portion, the surfaces abutting on each other;
the inclined surface is a surface inclined relative to the center axis of the shaft; and
the inclined surface makes the abutting surfaces of the clamping portion and the clamped portion slide along the inclined surface by converting a part of the biasing force of the helical compression spring, the biasing force being applied to the washer, into a force that moves the washer relative to the shaft in the radial direction, whereby the position of the center hole of the washer is deviated relative to the position of the shaft.

7. The tilting mechanism of a view device for a vehicle according to claim 6, wherein
the inclined surface is set in such a manner that at an intermediate position in a course of the abutment surfaces of the clamping portion and the clamped portions sliding relative to each other along the inclined surface via the biasing force of the helical compression spring, the outer circumferential surface of the shaft and the inner circumferential surface of the center hole of the washer abut on each other via the respective different diameter portions at the place at which the gap becomes narrow or zero, and movement of the washer in the radial direction relative to the shaft is thereby prevented,
whereby the tilting mechanism is configured in such a manner that the outer circumferential surface of the shaft and the inner circumferential surface of the center hole of the washer are kept being pushed against and abutting on each other via the respective different diameter portions at the place at which the gap becomes narrow or zero by the biasing force of the helical compression spring.

8. The tilting mechanism of a view device for a vehicle according to claim 1, wherein:
the outer circumferential surface of the shaft and the inner circumferential surface of the center hole of the washer each include a width-across-flats part forming the relevant different diameter portion; and
the deviation mechanism deviates the position of the center hole of the washer relative to the position of the shaft in such a manner that the gap becomes narrowed or zero at a place of one surface of two surfaces forming each of the width-across-flats parts, the two surfaces facing each other across the shaft.

* * * * *